(12) United States Patent
Creaser et al.

(10) Patent No.: US 10,016,966 B2
(45) Date of Patent: Jul. 10, 2018

(54) PREPREG FOR MANUFACTURING COMPOSITE MATERIALS

(71) Applicant: Gurit (UK) Ltd., Newport, Isle of Wight (GB)

(72) Inventors: Benjamin Creaser Creaser, Ryde (GB); Paul John Spencer, Southampton (GB)

(73) Assignee: Gurit (UK) Ltd., Newport, Isle of Wight (GB)

( * ) Notice: Subject to any disclaimer, the term of this patent is extended or adjusted under 35 U.S.C. 154(b) by 892 days.

(21) Appl. No.: 14/372,770

(22) PCT Filed: Jan. 17, 2013

(86) PCT No.: PCT/EP2013/050866
§ 371 (c)(1),
(2) Date: Jul. 17, 2014

(87) PCT Pub. No.: WO2013/107829
PCT Pub. Date: Jul. 25, 2013

(65) Prior Publication Data
US 2014/0374018 A1    Dec. 25, 2014

(30) Foreign Application Priority Data
Jan. 17, 2012 (GB) .................................. 1200741.5

(51) Int. Cl.
*B32B 3/10* (2006.01)
*B32B 37/26* (2006.01)
(Continued)

(52) U.S. Cl.
CPC .......... *B32B 37/26* (2013.01); *B32B 37/1018* (2013.01); *B32B 38/00* (2013.01);
(Continued)

(58) Field of Classification Search
None
See application file for complete search history.

(56) References Cited

U.S. PATENT DOCUMENTS 4,957,801 A * 9/1990 Maranci ................ B29C 70/086
428/147
5,057,353 A * 10/1991 Maranci ................ B29C 70/086
428/147
(Continued)

FOREIGN PATENT DOCUMENTS

| | | |
|---|---|---|
| EP | 1039168 A1 | 9/2000 |
| JP | 590199724 A | 11/1984 |
| WO | 2004096494 A | 11/2004 |

OTHER PUBLICATIONS

International Preliminary Report on Patentability dated Jul. 31, 2014 in International Application No. PCT/EP2013/050866.
(Continued)

*Primary Examiner* — Christopher Polley
(74) *Attorney, Agent, or Firm* — Polsinelli PC; Therese A. Hendricks

(57) ABSTRACT

A prepreg for manufacturing a fiber-reinforced composite material, the prepreg comprising a body comprising a layer of fibrous reinforcement impregnated with a matrix resin material, and a powder coating layer of resin material on at least one major surface of the body and adhered to the matrix resin material.

30 Claims, 14 Drawing Sheets

(51) Int. Cl.
*C08J 5/04* (2006.01)
*C08J 5/24* (2006.01)
*B32B 37/10* (2006.01)
*B32B 38/00* (2006.01)

(52) U.S. Cl.
CPC . *C08J 5/04* (2013.01); *C08J 5/24* (2013.01); *B32B 2038/0076* (2013.01); *C08J 2363/00* (2013.01); *Y10T 428/24372* (2015.01); *Y10T 428/24405* (2015.01); *Y10T 428/24893* (2015.01)

(56) References Cited

U.S. PATENT DOCUMENTS

| | | |
|---|---|---|
| 5,083,650 A | 1/1992 | Seiz |
| 5,198,281 A | 3/1993 | Muzzy et al. |
| 6,949,289 B1 | 9/2005 | Lawton et al. |

OTHER PUBLICATIONS

International Search Report dated May 17, 2013 in International Application No. PCT/EP2013/050866.
Search and Examination Report dated May 11, 201 in GB Application No. 1200741.5.

* cited by examiner

PREPREG FOR MANUFACTURING COMPOSITE MATERIALS

FIELD OF THE INVENTION

The present invention relates to a prepreg for manufacturing a fibre-reinforced composite material and to a method of manufacturing such prepreg. The present invention further relates to the use of such a prepreg for manufacturing a fibre-reinforced composite material.

BACKGROUND

It has been known for many years in the field of fibre-reinforced composite materials to provide a prepreg which comprises a layer of fibrous reinforcement impregnated with a structural polymer resin. The amount of structural polymer resin is carefully matched with the amount of fibrous reinforcement. Accordingly, the prepreg may be used in a method for forming a fibre-reinforced composite material, in which a multilayer stack of prepregs is provided having a desired shape and configuration, and then is subjected to heating so that the structural polymer resin melts and then solidifies to form a single unified resin matrix in which the fibrous reinforcement is disposed in the desired fibre orientation. The amount of resin in the stack is sufficient to make a fibre-reinforced structural article from the stack of prepregs which has the desired mechanical properties. Typically, the structural polymer resin is a thermosetting resin, most typically an epoxy resin, which is cured to form the solid resin matrix. The fibres may be selected from a variety of materials, most typically comprising glass fibres or carbon fibres.

It is very well known to provide prepregs in which the structural polymer resin is fully impregnated into the layer of fibrous reinforcement. This provides the outer major surfaces of the prepreg with a resin surface, distributes the fibres substantially uniformly throughout the prepreg resin so that the fibres are uniformly embedded within the resin and minimise the presence of inadvertent voids within the initial resin layer. This provides the advantage that the resin surface can be slightly tacky to assist lay up of the prepregs into the mould by supporting the prepreg at a desired position as a result of the adhesion of the prepreg by the tacky resin surface to an adjacent surface. In addition, the full impregnation of the fibrous reinforcement obviates the need for the structural polymer resin to flow significantly the curing phase, and ensures that the fibres wet out uniformly during the curing phase.

However, one particular problem with fully impregnated prepregs is that when a stack of such prepregs is formed, air can be trapped between the adjacent prepreg plies, with the result that in the final cured resin matrix of the fibre reinforced composite material inter-ply voids can exist. The presence of these voids can significantly reduce the mechanical properties of the composite material. As the layers of fully impregnated prepregs are progressively built up to form a multilayer stack thereof during the prepreg lay-up process, air can be trapped between the adjacent prepreg layers. The tackiness of the resin surfaces of the adjacent prepreg layers increases the possibility of air being trapped between the plies at the prepreg interfaces.

In addition, in order to provide such a fully impregnated prepreg with low tack, the matrix resin viscosity affects the drapeability of the prepreg, namely the ability of the prepreg to adopt a three dimensional shape of a mould surface. As a rule a higher drape resin has higher surface tack. There is a need in the art for a prepreg which has a combination of low tack and high drape.

It is known to use prepregs for manufacturing a wide variety of products, having a wide variety of thicknesses, shapes and volumes, and desired mechanical properties. One particular application for composite materials is the manufacture of structural elements in the form of elongate spars or beams which are required to exhibit a high mechanical stiffness and compressive strength. A "sparcap" is an elongate spar laminate which is incorporated into a particular layup for manufacturing a wind turbine blade, as is known in the art. The sparcap is an outer elongate capping laminate layer on opposite sides of a central structural element to form an elongate beam of enhanced mechanical strength similar to an "I" beam construction. For such spars or beams, in order to maximise the mechanical stiffness and compressive strength, it is desired to provide fibres which primarily are oriented along the direction of the elongate spar or beam, in particular are unidirectional fibres.

In contrast, to provide composite materials having a sheet-like construction, or providing a torsional strength, it would be desirable to provide biaxially oriented fibres.

The typical elongate members forming the main structural reinforcement in wind energy and tidal spar sections are 15-70 m long and 10 to 100 mm in thickness. They are made predominately from uni-directional fibres to give the longitudinal strength and stiffness. A typical spar cap section may contain 85 to 100% unidirectional fibre with some off axis material for shear transfer, torsional stiffness, and spar cap buckling stability depending on the design. Typically the thickness and or the width may change along the length of the spar to match the required design stiffness and stresses. There may also be a change in thickness in any given cross section to provide a suitable geometric and load transition to the shear webs. In addition to the changes in thickness the geometry of the spar cap can have curvature in one or more directions to match the desired aerodynamic profile and make beneficial use of curvature to reduce to reduce the tendency for the spar cap to buckle under load.

With the changing geometry and thickness the laminate is typically built up from plies of fibre reinforcement to give an economic balance of mould deposition rate, material cost, and geometrical flexibility in the design process. Typically glass reinforcement fabrics or prepregs with 500-2400 gsm areal fibre weight, or carbon reinforcement fabric or prepregs 100-900 gsm areal weight are used. These plies, or layers, can be pre-cut to geometrical shapes or used in roll format. With the changing curvature some shear is usually needed to accommodate the changing lengths between adjacent fibres in a sheet or roll of fibre reinforced material. The width and thickness of a given fibre reinforcement is typically limited to drape the material into the mould shape without significant fibre buckling or inducing fibre waviness In comparison to stitched, multiaxial and woven materials, multiple layers of unidirectional fibres will nest and pack efficiently leaving limited free volume space, which reduces air and resin permeability. Carbon fibres typically are smaller in diameter (7 micron) than glass fibres (17-24 micron) and therefore such carbon fibre stacks are harder to process reliably as they are inherently less permeable to air and resin.

In the VARTM (Vacuum Assisted Resin Transfer Moulding) method, dry fibres are laid into a mould and then impregnated with a low cost low viscosity liquid resin. The fibres are usually pre-stitched and or stabilised with thermoplastic binder to allow the fibre to be handled into the mould and to provide a controlled spacing between the fibres to form gaps to assist the flow of the resin. This adds both areas of unreinforced resin material and parasitic weight into the spar. The fibre support structure causes waviness of the fibres, reducing the final load carrying capacity, especially in compression. This method has been successfully used to produce current generations of glass fibre wind turbines where the design usually is stiffness limited and the laminate does not need the highest compression strength. Higher material performance is required for larger blades and newer generations of more aerodynamic efficient turbines where the spar cap spacing has been reduced to give a thinner blade section with improved aerodynamic efficiency. Here higher performance glass fibre or carbon fibre laminates are required.

Thick sections of carbon fibre have proved difficult to infuse reliably with the VARTM method due to the low permeability of the reinforcement. In the carbon spar design the compression strength becomes a key design driver. Economic savings are possible by using the improved material properties of prepreg materials which allow pure collimated fibre to be used.

The higher viscosity semi-solid prepreg resin then retains the fibres straighter in a collimated format during the prepreg manufacture and layup process to give laminates with less inherent fibre waviness and higher compressive strength. In addition, it is possible to select higher molecular weight materials and toughening additives to formulate prepreg resins to have both a high resin modulus and a good balance of toughness and strength to further enhance compressive properties and fatigue resistance.

To further maximise the strength it is desirable to remove any intralaminar and interlaminar void defects in thick, elongate spar cap sections. Traditionally this was done in the aerospace industry using high pressure autoclaves to compress any entrapped air and volatiles from the material. A number of out-of autoclave prepreg technologies have subsequently been developed to use vacuum only processing, in applications where the cost of using an autoclave becomes prohibitive for producing large sections such as wind turbines and tidal spars.

These current out-of autoclave materials which use partially impregnated or dry fibre layers provide good results in laminates containing a mixture of fibre orientations because the fibres bridge over themselves to form natural air conduits. These materials do not provide laminates with very low void levels, high levels of fibre alignment and tolerance to both high and low workshop temperature conditions when building large, thick laminates out of predominately uni-directional materials.

To improve the economics of producing these higher loaded turbine sections it is desirable to provide a drapeable, prepreg material suitable for direct layup, or off line pre-forming, in a wider range of ambient temperature conditions which can be cured using out-of-autoclave vacuum processing methods to give well aligned fibre reinforced laminates with low intralaminar and interlaminar void defects For an impregnated prepreg to have high drape the resin should be of a low viscosity with a low storage modulus to allow the draping shear to be accommodated as viscous resin flow without the prepreg tending to spring back to its original position.

It is known to provide a prepreg with a resin that has a low tack and a high viscosity and storage modulus. When a laminated stack of such prepregs is formed, and subjected to a vacuum de-bulking step to remove air, the resin maintains a degree of surface texture to provide air venting paths to eliminate trapped air during the de-bulking cycle. During moulding the resin then flows at and gives a homogenous material.

Such a material with a high viscosity resin is well suited to producing thick laminates when no significant curvature is required. To drape the product a degree of heat is needed to soften the resin. Heating lowers the viscosity of the resin but then the resin becomes prone to flowing and the air channels can be lost. This flow can occur before the vacuum is applied, in particular with some pre-flow of the resin during the lamination phase often resulting from variations in pressure and contact points which cause locked-in air regions. On applying the vacuum the softer resin can flow, which closes the remaining channels thereby reducing permeability of the laminate before the air has had time to be drawn out of the laminate stack.

The lower viscosity prepreg can then become very sensitive to its handling and any de-bulks before commencing cure. If a vacuum cycle is initiated and abandoned the material can consolidate and any surface texture venting paths can be lost. This is often more pronounced around the perimeter edges which can see higher forces depending on the vacuum bagging detail. On removing the vacuum air can slowly leak back between the material but on reapplying the vacuum the second and subsequent times the now compacted laminate stack is much less air permeable due to the previous viscous flow of the softer prepreg resin.

As such if drape and air breathability is required the process window can be reduced leading to the need to accurately control the workshop temperature environment, adding significant cost to the manufacturing process.

In an alternative attempt to overcome this undesirable formation of inter-ply voids, it has also been to provide prepregs which are only partially impregnated with the structural polymer resin so that a layer of dry fibre reinforcement is present on one or both of the major surfaces of the prepreg. Such a known partially impregnated prepreg, or semipreg, is manufactured by the applicant and sold under the registered trade mark SPRINT®.

Furthermore, when such partially impregnated prepregs are assembled together in a multi-laminar stack to form a structural member, during vacuum consolidation of the prepregs, the multi-laminar stack of prepregs can shrink in thickness, a phenomenon known in the art as "de-lofting". This "de-lofting" induces some out-of plane waviness to the uni-directional fibre which lowers the compressive mechanical properties, as the fibres will buckle earlier under compressive loads.

A number of prior patent specifications have addressed the problem of removing entrapped air in prepreg laminates in order to reduce the void content of the cured fibre reinforced composite material. In particular WO-A-2001/000405 discloses a partially impregnated prepreg, having dry fibres in the centre; EP-A-1128958 discloses a prepreg with a central resin layer and outer dry fibre layers; EP-A-1379376 discloses providing a non-continuous resin layer in a prepreg with a central resin layer and outer dry fibre layers; WO-A-2002/088231 discloses providing bands of resin film on the fibrous surface; EP-A-2268720 discloses providing a high viscosity rigid resin at least at the surface of the prepreg, combined with an embossed resin surface to provide an air channel; EP-A-1595689 discloses a scrim partly impressed into a resin surface of a fully impregnated prepreg; EP-A-2254936 discloses printing resin regions onto a prepreg; and WO-A-2012052272 discloses providing dry fibre channels in a prepreg surface, optionally combined with a scrim partly impressed into a resin surface of the prepreg.

All of these prior disclosures suffer from various problems in reliably and cost-effectively producing void free large dimension structural members, particularly incorporating unidirectional fibres, where the combination of high air permeability of the resin stack, high drape, low tack, low loft and high fibre collimation can be achieved to provide a structural member with high mechanical properties.

There is therefore still the need for a prepreg, which has particular application for the manufacture of structural members such as spars, in particular for wind turbine blades, which overcomes the problems of fully impregnated prepregs, scrim-coated fully impregnated prepregs and partially impregnated prepregs as discussed above.

It is also well known in the composite material art to provide a two-phase matrix resin system in which the matrix resin, as well as surrounding fibrous reinforcement, includes a second phase of fine particles which enhances the toughness, in particular the impact resistance, the fibre reinforced resin composite material. Various methods are known for incorporating the particles into the matrix resin. For example, EP-A-0274889 and EP-A-0745640 disclose incorporating particles into the matrix resin using a variety of techniques, including applying particles to the prepreg surface prior to layup and curing so that after curing the particles are concentrated in a matrix resin layer at the internal surface(s) of the cured composite corresponding to the original prepreg layers. There is no disclosure of how to provide a prepreg with a structure or properties to provide a laminated prepreg stack with increased air venting.

The present invention at least partially aims to overcome these technical problems of known prepregs for the manufacturing of structural members, in particular elongate structural members in the form of spars or beams.

SUMMARY OF THE INVENTION

Accordingly, the present invention provides a prepreg for manufacturing a fibre-reinforced composite material, the prepreg comprising a body comprising a layer of fibrous reinforcement impregnated with a matrix resin material, and a powder coating layer on at least one major surface of the body and adhered to the matrix resin material, the powder coating layer including particles projecting outwardly from the matrix resin material and being porous to air flow in a direction along the plane of the powder coating layer.

In preferred embodiments the particles comprise resin material.

The present invention further provides a method of producing a prepreg for manufacturing a fibre-reinforced composite material, the method comprising the steps of: (a) providing a substrate comprising a layer of fibrous reinforcement impregnated with a matrix resin material; and (b) applying a powder coating layer to at least one major surface of the layer of fibrous reinforcement, the powder coating layer including particles projecting outwardly from the matrix resin material and being porous to air flow in a direction along the plane of the powder coating layer.

The present invention further provides a method of manufacturing a structural member of fibre-reinforced composite material, the method comprising the steps of:
i. providing a plurality of prepregs according to the present invention or produced according to the method of the present invention;
ii. assembling the plurality of prepregs as a stack thereof so that the powder coating layer of at least one of the prepregs is adjacent to a powder coating layer or matrix resin surface of an adjacent prepreg to form at least one air passage between the prepregs;
iii. subjecting the stack to a vacuum to consolidate the stack and remove air from between the adjacent prepregs of the stack, the at least one air passage venting air between the prepregs; and
iv. curing the matrix resin material to form the structural member.

The present invention further provides the use of a prepreg according to the present invention or produced according to the method of the present invention for manufacturing an elongate structural member of fibre-reinforced composite material, in particular a spar or beam.

The present invention also provides a method of manufacturing a structural member of fibre-reinforced composite material, the method comprising the steps of:
(a) providing a prepreg comprising a body comprising a layer of fibrous reinforcement impregnated with a matrix resin material, and a powder coating layer on at least one major surface of the body and adhered to the matrix resin material, the powder coating including particles projecting outwardly from the matrix resin material;
(b) assembling a plurality of the prepregs as a stack thereof so that the powder coating layer of at least one of the prepregs is adjacent to a powder coated layer or matrix resin surface of an adjacent prepreg to form at least one air passage between the prepregs;
(c) subjecting the stack to a vacuum to consolidate the stack and remove air from between the adjacent prepregs of the stack, the at least one air passage venting air between the prepregs; and
(d) curing the matrix resin material to form the structural member.

The powder coating layer is porous to air flow in a direction along the plane of the coating layer.

The term "prepreg" in this patent specification refers to not only to fully resin impregnated fibre but also to dry and partially impregnated products which provide a controlled amount of resin and fibre reinforcement such that it is a ready to use moulding material which will form a suitable a fibre reinforced laminate during the subsequent processing and cure.

The present invention is predicated on the finding by the present inventors that a prepreg, which may be a fully impregnated prepreg, can be provided with a combination of bulk and surface properties, in particular high drape and low surface tack, which can provide enhanced air removal from a stack of prepregs. The result is a prepreg which can provide even lower void content in the resulting cured fibre reinforced resin matrix composite materials. The prepreg can readily be handled, due to low surface tack, and laid up into three dimensionally profiled moulds, due to high drape. The prepreg has particular application for the manufacture of an elongate structural member, such as a spar or beam, most particularly a sparcap for a wind turbine blade.

The prepreg has a coating layer, optionally of resin particles, which is porous to air flow in a direction along the plane of the coating.

Each fully impregnated prepreg ply may have a low initial air content within the prepreg, lower than for a partially impregnated prepreg, and this in turn assists in the reduction of the presence of voids within the cured composite material.

Such a fully impregnated prepreg structure retains the unidirectional fibres in the correct longitudinal alignment, and there is little or no distortion of the fibres in a transverse or through thickness direction. The powder coating does not materially affect longitudinal fibre alignment. This not only increases the mechanical properties of the structural member, in particular as compared to the use of semi-pregs in which misalignment is problematic, but also decreases the lay-up times compared to semi-pregs, because semi-pregs require careful positioning when forming the prepreg stack in order to minimise inadvertent distortion of the exposed outer dry fibres. The fully impregnated prepreg structure also avoids the de-lofting and in-plane waviness problems associated with the use of semi-pregs.

The preferred embodiments of the present invention therefore provide a prepreg material which is impregnated with a first resin which has viscoelastic properties to give high levels of drape and easy and fast impregnation of the fibrous material during manufacture. The impregnated prepreg is then substantially coated with powder, preferably on both the upper and lower surfaces to then form a low tack prepreg with a temperature tolerant air permeable powder coating. In some embodiments the coating substantially covers the surface to prevent migration of the underlying resin during storage and layup. In other embodiments the coating substantially covers the surface to prevent migration of the underlying resin during storage and layup except in localised spots where it may be omitted to provide small zones of tacky resin sufficient to adhere the prepreg to mould surfaces and other piles of material without reducing the overall venting properties of the prepreg.

In some embodiments, the powder coating may be composed of a resin material, such that the resin material of the particles is co-polymerisable with the matrix resin material.

In other embodiments, the powder coating may be composed of another material, which may not be a resin, provided that the powder coating includes particles projecting outwardly from the matrix resin material so that when a plurality of the prepregs are assembled as a stack thereof so that the powder coating layer of at least one of the prepregs is adjacent to a powder coated layer or matrix resin surface of an adjacent prepreg, the powder coating layer forms at least one air passage between the prepregs. During vacuum consolidation of the prepreg stack, which removes air from between the adjacent prepregs of the stack, the at least one air passage vents air between the prepregs.

Preferably the powder coating has a low bulk density. Preferably the powder coating has melting and glass transition temperatures higher than the prepreg intended or specified storage and lay-up temperatures to prevent flow and particle sintering thereby to maintain the air venting properties of the coating during lay-up and subsequent vacuum consolidation. This coating provides enhanced air permeability without excess de-lofting during cure to maintain fibre alignment.

The powder coating may form a continuous or discontinuous particle layer on the matrix resin surface.

Preferably the coating then melts and/or dissolves during the curing process and is co-curable with the matrix resin to avoid potential weak planes of un-reinforced resin.

The prepreg can be heated to assist the adhesion of the powder and excess, non-adhered powder may also be removed using brushing or air knife methods to leave at least one an adhered powder layer on a respective prepreg surface.

With the powder coating it becomes possible to use a resin that has a lower viscosity and would have been too tacky to handle as a conventional prepreg. This allows a more drapeable prepreg to be formed at a given application temperature and the lower viscosity allows faster and more reliable hot-melt impregnation of the carbon reinforcement.

It has been found that resins known for use in other resin coating applications by powder coating methods are ideal for coating prepregs because the resins can flow during the elevated temperature curing step and then co-cure with the primary matrix resin. These resin materials are designed not to sinter in storage, the glass transition temperature Tg and the melting temperature Tm of these coating resins is each typically in excess of 55° C. As such the coating resins are more rigid during layup temperatures and do not have a tendency to sinter and flow, thereby maintaining the air venting structure of the powder coating prior to and during vacuum consolidation. The individual powder particles are not fused and so do not add rigidity to the prepreg, unlike a solid resin film or fibre scrim, and the drape of the central coated prepreg is maintained. Unlike solid resin coatings that are used to form channels or fabric scrims that provide air passages next to the scrim fibres by a ply bridging effect, a more even thickness is obtained by using the powder coating, leading to reduced fibre waviness after subsequent consolidation.

By providing a powder coating between prepreg plies of the layup, the interlaminar air venting properties of the layup are maximised for a given consolidation thickness, because the venting space and porosity are concentrated in the interply region. The powder coating provides enhanced interlaminar air permeability without excess thickness consolidation during cure, because the prepreg has been fully impregnated and the porosity providing the air transport permeability is then targeted in the interply region only.

The porosity formed between two plies of prepreg material by the powder coating provides multiple air networks for venting the interlaminar air. In addition, the powder coating has a very even thickness. These structural features together provide improved tolerance to localised laminating or edge pressure, which could otherwise tend to cause early resin flow and air path lock-off prior to or during vacuum consolidation.

The powder coating allows a lower viscosity, tackier, resin to be used as the primary matrix resin as compared to the corresponding properties of the primary matrix resin that would be required in the absence of a powder coating in order to exhibit sufficiently low tack for the prepreg to be readily handleable. The powder coated prepreg therefore allows the prepreg with a given tack to employ a low viscosity primary matrix resin. This provides the advantage that such a lower viscosity resin is easier to hot-melt impregnate into the fibrous reinforcement, providing a faster line speed during the impregnation process. In addition, the prepreg is more drapeable, because a lower viscosity primary matrix resin is employed, and the prepreg can be employed at lower layup temperatures can be used in an extended process window as compared to prepregs employing higher viscosity matrix resins.

The powder coating adheres reliably and uniformly to the low viscosity tacky primary matrix resin, and can readily securely cover the complete surface with a high powder loading. Such complete coverage with high powder loading provides enhanced air venting properties of the powder coating layer on the prepreg surface.

In some preferred embodiments of the present invention, the powder coating may provide a sufficiently dry and tack free surface that when the prepreg is wound into a roll the adjacent prepreg layers do not adhere together and the roll can reliably be unwound when required for use. This allows the prepreg to be made without interleaving the layers with release backing material layers, such as polyethylene, to reduce the cost by eliminating this consumable waste.

In accordance with the preferred embodiments of the present invention, a resin powder having a controlled particle size is applied in a controlled amount to one or more prepreg surfaces after prepreg impregnation to give the combination of (a) an air venting structure on the prepreg surface(s) and (b) a controlled level of tack and handling properties over a wide temperature range, for example from 10 to 45° C. which is a typical temperature range for prepreg layup temperatures. The powder particle size is selected to give good breathing and later prepreg roll storage properties.

The powder particles are preferred to melt or dissolve into the matrix resin during cure of the matrix resin at elevated temperature to avoid air voids and to avoid causing fibre disorientation by the particles. The resin of the particles and the matrix resin when cured may form a single phase cured resin matrix.

The powder particles may be selected to have a secondary functional benefit such as one or more of toughening, fire retardant properties, surface print reduction, and tack control.

In the preferred embodiments of the invention the particles are composed of resin, in particular resin which forms a single phase with the matrix resin after curing, such as the particles including or consisting of a thermosetting resin. However, some or all of the particles of the powder coating layer may be composed of other materials, such as one or more of inorganic materials (for example to provide toughening and/or fire retardance), thermoplastic resins (for example to provide toughening), or elastomeric materials (for example to provide toughening), to provide an additional function as well as providing an air porous surface and low tack to the prepreg.

Particularly preferred particles are composed of ground high molecular weight (Mw) epoxy resin. It has been found such epoxy resin particles can comprise a curable resin composition which does not include a curing agent. This can be employed without any significant reduction in the mechanical properties of the finally cured composite material. Instead, the particle resin dissolves in and diffuses through the matrix resin, and then reacts with the curing agent in the matrix resin, which also acts as the curing agent in the particle resin which is co-cured, and so co-polymerised, with the matrix resin.

The powder particles may have a sufficiently high Tg to avoid sintering when the powder is processed and handled during prepreg manufacture and subsequent storage of the prepreg in roll form. The absence of sintering provides that the prepreg surface coated with the powder retains an air permeable venting path until layup of the prepreg.

The powder-coated surface of the prepreg promotes sliding of the prepreg plies during layup and subsequent vacuum consolidation. This provides enhanced drape, and avoids ply bridging defects, during layup, particularly when manufacturing spar caps of wind turbine blades.

The viscosity of the primary matrix resin of the prepreg, the particle distribution, and manufacturing application are selected to avoid the particles becoming fully incorporated into the resin during prepreg manufacture and subsequent storage of the prepreg in roll form. The powder particles are only adhered at the prepreg surface so that interlaminar surface porosity is formed when the prepreg plies are laminated together.

The preferred embodiments of the present invention therefore allow the production of high quality prepregs, which may be fully or partly impregnated, with straight fibre orientation and no intra-laminar voids, which after lamination, vacuum consolidation and curing minimise any deloft and waviness on cure by providing air permeability in the interply regions of the laminate stack.

In accordance with a further aspect of the present invention, the powder coating comprises a toughening additive material which is subsequently dispersed into matrix resin material during processing of the prepreg, for example when manufacturing the fibre-reinforced composite material, and acts as a toughening additive for the fibre-reinforced composite material.

In some embodiments the toughening additive may melt and/or dissolve during the curing process and then may phase separate to form a fine distribution of toughening domains. Alternatively, in other embodiments the toughening additive may have an initial fine dispersion and may not melt or dissolve during the curing process, with the dispersion forming a phase of a fine distribution of toughening domains.

Such a toughening particle can provides not only increased toughness but also increased air breathing during processing as described herein.

It has been found by the inventors that the use a powder coating of thermoplastic or elastomeric powder particles to increase fracture toughness also increases air-breathe to create a lower void content laminate. Furthermore, after processing a toughened interlaminar region between adjacent prepreg plies is provided. The composite laminate can be effectively toughened without dispersing the toughening additive throughout the entire matrix resin, but by dispersion of the toughening particles at interlaminar regions.

The powder particles can not only increase the air breathing properties of the prepreg but can also increase the handling properties, even if the particles are fully pressed into or impregnated into the matrix resin material, because they at least partially cover the tacky matrix resin material and reduce the tack of the prepreg surface.

The powder of toughening additive material may be coated on one major surface or both major surfaces of the prepreg. Typically, the powder particles may comprise a thermoplastic resin or elastomeric rubber such as, for example, one or more of materials selected from block copolymers, polyimides, polyether imides, polyether sulfones, polyarylates, polyphenylene oxides, polyether ether ketones, polyphenylsulfones, acrylic rubbers, silicone rubbers, phenoxy thermoplastics, polyesters, nitrile rubbers, or other polymeric resin particles known to toughen thermoset composite materials.

The powder of toughening additive material may be fully impregnated into, or partially impregnated into, or not impregnated but adhered to, the respective major surface of the prepreg.

Typically, the powder particles may be applied at a coating weight of from 5-40 $g/m^2$, although higher coating amounts may be used to increase fracture toughness further.

In some embodiments, the toughening particle may be blended with a resin material which is co-polymerisable with the matrix resin material, for example the resin material comprising an epoxide resin, or any other co-polymerisable resin disclosed herein.

The particle size must be small enough to achieve a toughness improvement, typically being less than 250 microns, for example from 50 to 200 microns.

In some embodiments the melting point of the toughening particle is below the cure temperature of the matrix resin material of the prepreg in order to improve particle dispersion, and hence toughening.

The toughening parameters GIC and GIIC of composite materials have been found to increase by 50-200% by using the toughening additive power coating in accordance with the invention, without reducing other mechanical properties.

In this aspect of the invention it is the objective to provide a toughened interleave region to increase fracture toughness properties. Traditionally, thermoplastics or elastomers are dispersed throughout the thermoset resin matrix. During cure of the laminate, these form separate rubber phases within the resin matrix. The presence of these phases increases toughness properties through several different mechanisms; namely, crack bridging, shear banding and cavitation. There are several disadvantages to this approach: the use of thermoplastic or elastomers increases the cost of the system, the viscosity of the resin system increases significantly and other properties (such as stiffness related properties) are reduced.

In accordance with this aspect of the invention, by providing the toughening particles only in the interlaminar regions of the composite material, the toughness is increased with minimal reduction of stiffness related properties. In addition, material cost is reduced, because a lower net amount of toughener additive is used, and resin viscosity remains unchanged.

The present invention accordingly further provides a prepreg for manufacturing a fibre-reinforced composite material, the prepreg comprising a body comprising a layer of fibrous reinforcement impregnated with a matrix resin material, and a powder coating layer in at least one major surface of the body and embedded into the matrix resin material at the major surface of the body, wherein the powder coating layer comprises a toughening additive material comprised of a polymeric resin selected from at least one or more of a thermoplastic resin and an elastomeric rubber.

In one embodiment the body has two opposed major surfaces and the powder coating layer is on both major surfaces. In another embodiment the powder coating layer substantially covers the at least one major surface.

Optionally, the layer of fibrous reinforcement is fully impregnated by the matrix resin material.

Typically, the prepreg is elongate and extends in a longitudinal direction and the layer of fibrous reinforcement is a unidirectional fibrous reinforcement extending in the longitudinal direction of the prepreg.

Optionally, the matrix resin material is composed of a thermosetting resin, for example epoxy resin.

Optionally, the toughening additive material is comprised of one or more materials selected from block copolymers, polyimides, polyether imides, polyether sulfones, polyarylates, polyphenylene oxides, polyether ether ketones, polyphenylsulfones, acrylic rubbers, silicone rubbers, phenoxy thermoplastics, polyesters, nitrile rubbers, or other polymeric resin particles known to toughen thermoset composite materials.

Optionally, the toughening additive material is blended with a resin material which is co-polymerisable with the matrix resin material.

Optionally, the toughening additive material is applied a coating weight of from 5 to 40 g/m$^2$.

Optionally, the toughening additive material has a particle size of less than 250 microns, optionally from 50 to 200 microns.

Optionally, the toughening additive material has a melting point below the cure temperature of the matrix resin material of the prepreg.

Preferably, the prepreg is formed as a wound roll of the prepreg, optionally wherein adjacent prepreg layers of the roll are substantially unadhered to each other.

BRIEF DESCRIPTION OF THE FIGURES

Embodiments of the present invention will now be described by way of example only, with reference to the accompanying drawings, in which:

FIG. 16 is a schematic plan view of a polyester scrim applied to major surfaces of a prepreg of Comparative Examples not according to the invention; and.

DETAILED DESCRIPTION

Figure 1:
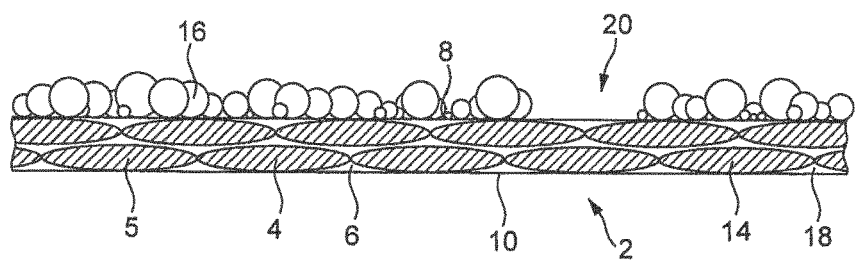
FIG. 1 is a schematic cross sectional drawing of a prepreg to form a fibre-reinforced composite material in accordance with a first embodiment of the present invention.
Figure 2:
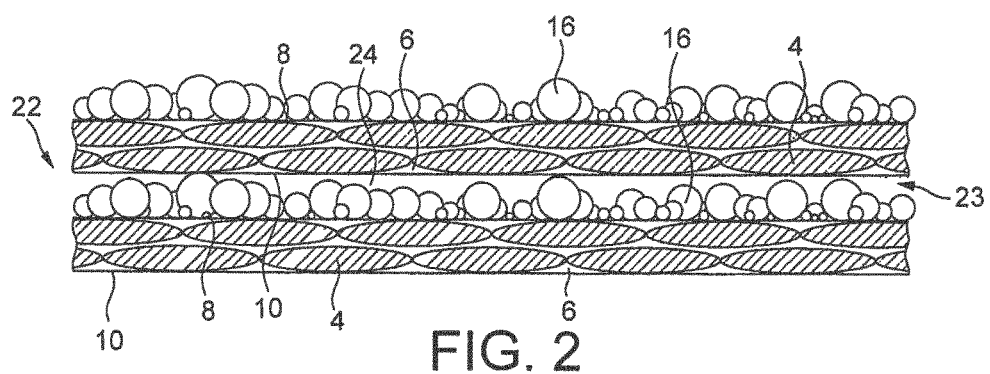
FIG. 2 is a schematic cross sectional drawing of a layup comprising a stack of two prepregs of FIG. 1.

Referring to FIGS. 1 and 2, there is shown a prepreg 2 in accordance with a first embodiment of the present invention. For clarity of illustration, some dimensions in the drawings are exaggerated and only some of the fibres are shown.

The prepreg 2 comprises a layer of fibrous reinforcement 4, illustrated as a plurality of tows or fibre bundles 5, which is substantially fully impregnated by a matrix resin 6. The full impregnation provides that the opposed major surfaces 8, 10 of the prepreg 2 comprise resin surfaces. The resin 6 is typically an epoxy-functional resin including a latent curing agent, as is known in the art. Other resins, particularly thermosetting resins, may be employed. The fibrous reinforcement 4 comprises fibres 14 made of glass, carbon, aramid or similar materials. The fibres 14 are unidirectional (UD), being oriented in a common longitudinal direction perpendicular to the plane of the drawings of FIGS. 1 and 2. Preferably, the prepreg 2 is elongate and extends in a longitudinal direction and the layer of fibrous reinforcement 4 is a unidirectional fibrous reinforcement extending in the longitudinal direction of the prepreg 2.

Most typically, for manufacture of a carbon fibre structural element such as a sparcap, the fibrous reinforcement 4 comprises 100-900 g/m², and more preferably 400 to 800 g/m², typically 600 g/m², unidirectional carbon fibre in an epoxy or vinyl ester resin matrix.

Most typically, for manufacture of a glass fibre structural element such as a sparcap, the fibrous reinforcement 4 comprises 500-2400 g/m², and more preferably 1200-1600 g/m² unidirectional glass fibre in an epoxy or vinyl ester resin matrix.

The prepreg thickness may typically range from 0.1 to 1.5 mm. A typical prepreg thickness for glass fibre, in particular unidirectional glass fibre, is about 1.2 mm, whereas a typical prepreg thickness for carbon fibre, in particular unidirectional carbon fibre, is about 0.6 mm A powder coating layer 16 of resin material is on at least one major surface 8 of the body 18 which comprises the fibrous reinforcement 4 and the matrix resin 6. The powder coating layer 16 is adhered to the matrix resin 6. The powder particles are adhered to the outer primary matrix resin surface by the inherent tack of the primary matrix resin 6. In the embodiment of FIGS. 1 and 2 the powder coating layer 16 on only one major surface 8 of the body 18.

In the illustrated embodiment, the powder coating layer 16 substantially covers the at least one major surface 8. Alternatively, the powder coating layer 16 partly covers the at least one major surface 8 and leaves at least some uncovered areas 20, as shown in FIG. 1 only, which expose the matrix resin material 6. Optionally, the uncovered areas 20 are arranged in a mutually spaced array.

The powder coating layer 16 includes resin particles 21 typically having a particle size of from 25 to 2000 microns, optionally from 50 to 1000 microns, further optionally from 75 to 750 micron, still further optionally from 100 to 600 microns, yet further optionally from 175 to 500 microns, still further optionally from 250 to 500 microns. Preferably, at least 50% of the particles 21 of the powder coating layer 16 have a particle size of from 25 to 2000 microns, optionally from 50 to 1000 microns, further optionally from 75 to 750 micron, still further optionally from 100 to 600 microns, yet further optionally from 175 to 500 microns, still further optionally from 250 to 500 microns.

In FIGS. 1 to 4 the particle 21 are shown schematically as being spherical. This is purely illustrative and the particles may be spherical or more typically irregular in three-dimensional shape. Such an irregular three-dimensional shape provides the advantage that the particles have a reduced incidence of being wet out by the matrix resin, and so submerged within the matrix resin, and also the irregular shape increases the propensity of air passages to form between the powder coating layer(s) or the powder coating layer and a matrix resin surface, as described hereinbelow.

The particles 21 project outwardly from the matrix resin surface, and typically for at least a majority (50%) of the particles in the powder coating layer, greater than 50%, more typically greater than 75% of the particle height is exposed above the matrix resin surface.

The powder coating layer 16 of resin material typically has a coating weight of from 5 to 50 grams per square meter, optionally from 10 to 30 grams per square meter, further optionally from 15 to 25 grams per square meter.

In some embodiments, the powder coating layer 16 comprises powder particles 21 having a coating weight of from 15 to 25 grams per square meter of particles 21 having a particle size of from 250-500 microns, optionally further comprising additional powder particles 21 at a coating weight of from 1 to 5 grams per square meter of particles 21 having a particle size of from 2-100 microns. The smaller particles 21 can fit between the larger particles 21 to reduce the tack of the powder coated resin surface 8.

Typically, the powder coating layer 16 comprises substantially a monolayer of powder particles 21 on the major surface 8 of the body 18. The monolayer may be continuous or discontinuous. The powder particles 21 are typically partly embedded into the matrix resin material 6 at the major surface 8 of the body 18.

The matrix resin material 6 and the resin material of the powder coating layer 16 are typically both composed of a thermosetting resin, and typically the matrix resin material 6 and the resin material of the powder coating layer 16 are each an epoxy resin. Accordingly, most typically the matrix resin material 6 and the resin material of the powder coating layer 16 are co-polymerisable.

In a preferred embodiment, when both the resin material of the powder coating layer 16 and the matrix resin material 6 are in a molten state, the resin material of the powder coating layer 16 is soluble in the matrix resin material 6. Typically, the resin material of the powder coating layer 16 has a higher melting point than the matrix resin material 6, and additionally the resin material of the powder coating layer 16 has a higher Tg than the matrix resin material 6. Optionally, the melting point of the powder is below 85° C.

Referring to FIG. 2, plural (for example two, as illustrated, or more) of the prepregs 2 of FIG. 1 are laid-up as a stack 22, with the powder coating layer 16 of one prepreg 2 being adjacent to and contacting the uncoated matrix resin material surface 10 of the adjacent prepreg 2 of the stack 22. The powder particles 21 of the powder coating layer 16 are sandwiched between and contact the opposed resin surfaces 10, 8 and provide one or more passages 24 between the opposed resin surfaces 10, 8 of the adjacent prepregs 2. Consequently, air is free to travel through the passage(s) in a direction along the powder coating layer 16 along the interface 23 between the opposed resin surfaces 10, 8 of the adjacent prepregs 2.

The particle size and distribution of the powder particles 21 of the powder coating layer 16 are selected to provide an air transport path which is sufficient for the structure, area and configuration of the product to be manufactured, in turn so that the overall air transport pathway for any given area of the product is sufficient. It has been found that a particle size and distribution as described above reliably provides effective air removal for a variety of different layup configurations without providing resin immiscibility which in turn could result in void problems.

Figure 3:
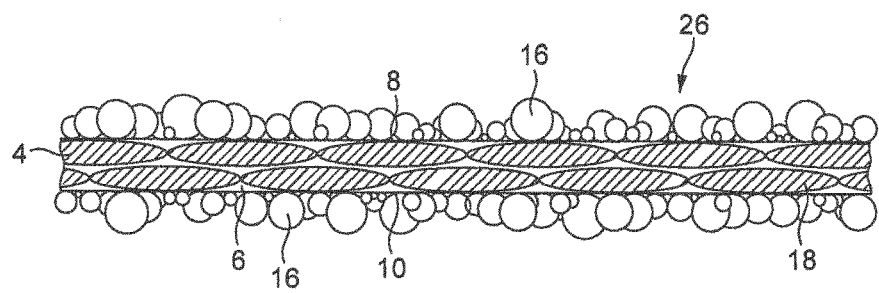
FIG. 3 is a schematic cross sectional drawing of a prepreg to form a fibre-reinforced composite material in accordance with a second embodiment of the present invention.
Figure 4:
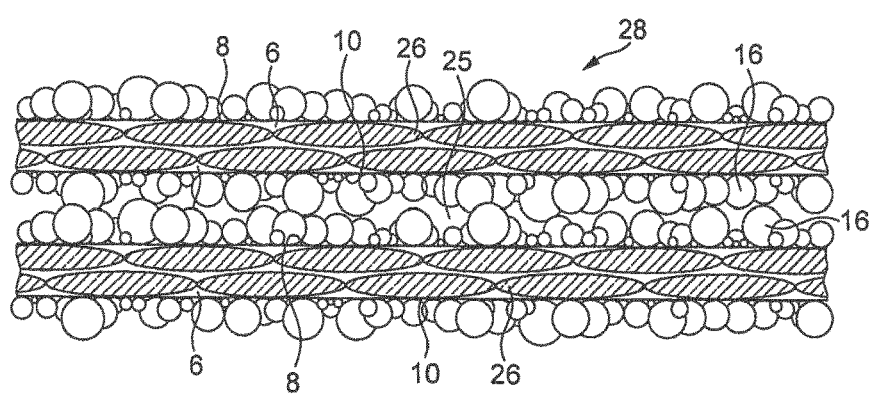
FIG. 4 is a schematic cross sectional drawing of a layup comprising a stack of two prepregs of FIG. 3.

In the alternative embodiment of FIG. 3, a respective powder coating layer 16 as described above is on a respective one of two opposed major surfaces 8, 10 of the body 18 of a prepreg 26 having the structure as described above. This provides that when plural prepregs 26 are laid up as a stack 28, as shown in FIG. 4, two powder coating layers 16, one on each opposed prepreg surface 10, 8, engage together between each pair of prepregs 26 to provide one or more passages 25 between the opposed powder coating layers 16 of the adjacent prepregs 26. This modification provides an even higher passage content between the layers of matrix resin material 6 in order further to enhance the air transport properties between the adjacent prepregs 26.

For either embodiment, when the coated prepreg 2, 26 is formed as a wound roll of the prepreg, wherein the powder coatings 16 of adjacent prepreg layers of the roll directly contact each other or contact the opposite resin surface 10, the adjacent powder coatings 16 or coating 16 and opposite resin surface 10 can be substantially unadhered to each other so that an interlayer of release material, such as polyethylene, can be avoided. This reduces the production costs and avoids the need for disposal of the interlayer release ply The embodiments of FIGS. 1 to 4 illustrate fully impregnated prepregs 2, 26 in which substantially no dry fibres are present and substantially all of the fibrous reinforcement 4 is impregnated with the matrix resin 6. However, the invention may also be employed with partially impregnated or even unimpregnated prepregs where an outer resin surface is present which is coated with the powder coating layer 16. Such a partially impregnated prepreg may include a central layer of dry fibres between outer resin layers, or dry fibre channels in an outer resin surface. Such a partially impregnated or unimpregnated prepreg may include one or more layers of dry fibres adjacent to at least one resin layer, with there being an outer resin surface coated with the powder coating. For any of these embodiments, the powder coating can control the tack of the resin film to be more even across a wider temperature range, and optionally resin areas free of powder may provide tacky resin spots if required for some applications.

Figure 5:
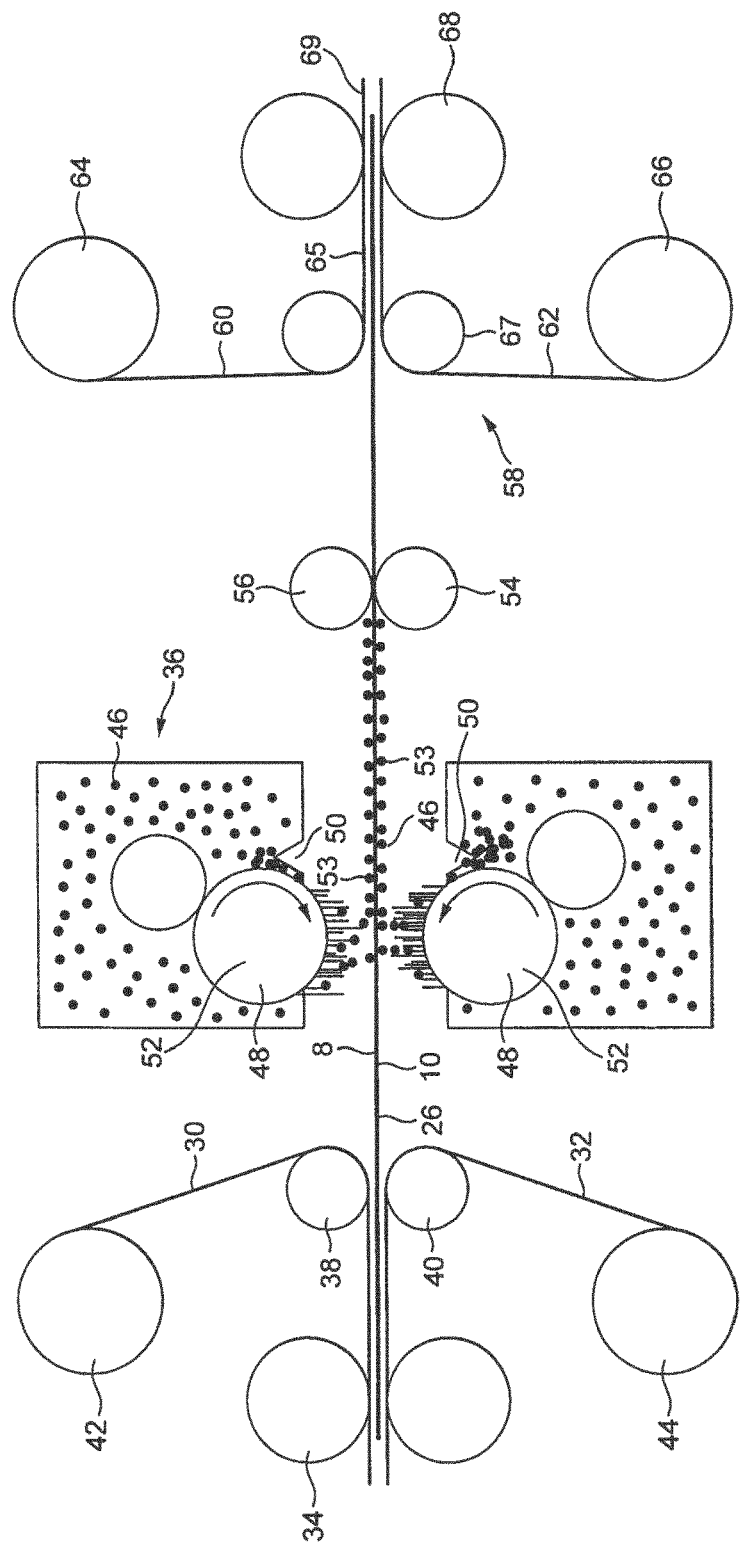
FIG. 5 is a schematic side view of one embodiment of an apparatus for the manufacture of a prepreg of FIG. 3.

Referring to FIG. 5, there is shown a schematic perspective drawing showing one embodiment of a method for the manufacture of the prepreg of FIG. 3. In the illustrated embodiment, the prepreg 26 is typically manufactured by impregnating the fibrous reinforcement 4 from opposed sides, by using two resin films and with the fibrous reinforcement 4 sandwiched therebetween. During the impregnation step, each resin film is impregnated towards the centre of the layer of fibrous reinforcement 4, and the two resins join at the centre to form a fully impregnated prepreg with resin 6 extending through the entire thickness of the fibrous reinforcement 4. After impregnation, the opposed major surfaces 8, 10 of the prepreg 26 are temporarily protected from inadvertent damage or deposits by being covered by respective protective webs, for example paper sheets.

In an alternative embodiment, the prepreg is manufactured by providing a layer of resin between two layers of fibrous reinforcement and the resin is impregnated outwardly into the fibres. In a further alternative embodiment, the prepreg is manufactured by providing a layer of resin adjacent to between a layer of fibrous reinforcement and the resin is impregnated outwardly into the adjacent surface of the fibrous layer.

As shown in FIG. 5, which shows exaggerated dimensions for clarity of illustration, the prepreg 26 carrying the protective paper sheets 30, 32 is fed by a pair of nip rollers 34 towards a coating station 36. Prior to the coating station 36 the protective paper sheets 30, 32 are removed by being partly pulled around respective rollers 38, 40 and wound around respective take-up rolls 42, 44. The prepreg 26 with exposed upper and lower surfaces 8, 10 is then conveyed through the coating station 36.

At the coating station 36, particles 46 of the powder coating of resin material are simultaneously applied to the opposed major surfaces 8, 10 by a pair of electrostatic magnetic brushes 48, each facing a respective surface 8, 10 to be coated. Such an electrostatic magnetic brush 48 is known in the art. A doctor blade 50 controls the loading of resin material particles 46 onto the brush roller 52 to provide a uniform layer 53 of particles 46 covering the entire surface 8, 10 of the prepreg 26. The coated prepreg 26 then passes through a pair of consolidating rollers 54 which typically have a surface 56 composed of a releasable material such as PTFE. The consolidating rollers 54 apply pressure, and optionally heat, to ensure that the particles 46 are securely adhered to the primary matrix resin surfaces 8, 10 to form an even uniform coating layer 53. The consolidating rollers 54 may optionally be heated to assist the adhesion step, but at a temperature which does not cause resin melting or curing or cause the particles to be submerged in the matrix resin, for example at a temperature of greater than ambient temperature (20° C.) to up to 40° C.

Then the coated prepreg 26 is conveyed to a backing layer applying station 58 at which an elongate backing web 60, 62 of release material, such as silicone-coated paper or plastic material, e.g. polyethylene or polypropylene, is applied to each powder coated surface 8, 10. The backing webs 60, 62 are each unwound from a respective reel 64, 66 and the sandwich 65 of backing web 60, coated prepreg 26, backing web 62 passes continuously between a pair of application rollers 67 and then through a pair of nip rollers 68.

The resultant assembly comprises a three layer sandwich 69 of powder coating resin material layer/prepreg layer comprising fibre reinforcement in the primary matrix resin material layer/powder coating resin material layer which is temporarily located between backing web layers 60, 62.

As described earlier, in some embodiments the backing web layers 60, 62 may be omitted when the powder coating resin material layers do not self-adhere when the prepreg is wound into a roll.

Typically, the prepreg 2, 26 has an indeterminate or unspecified length in the longitudinal direction of orientation of the fibres 14, and is supplied as a roll, for example on a cylindrical core. The prepreg 2, 26, when used to manufacture an elongate structural member such as a sparcap as described hereinbelow, has a relatively narrow width, so that an elongate spar or beam can be manufactured. However, the prepreg may be manufactured by the formation of an initial wider sheet of unspecified length, with the sheet subsequently being slit longitudinally into a plurality of narrower strips, or cut to provide a desired plan shape, each defining a respective prepreg 2.

Figure 6:
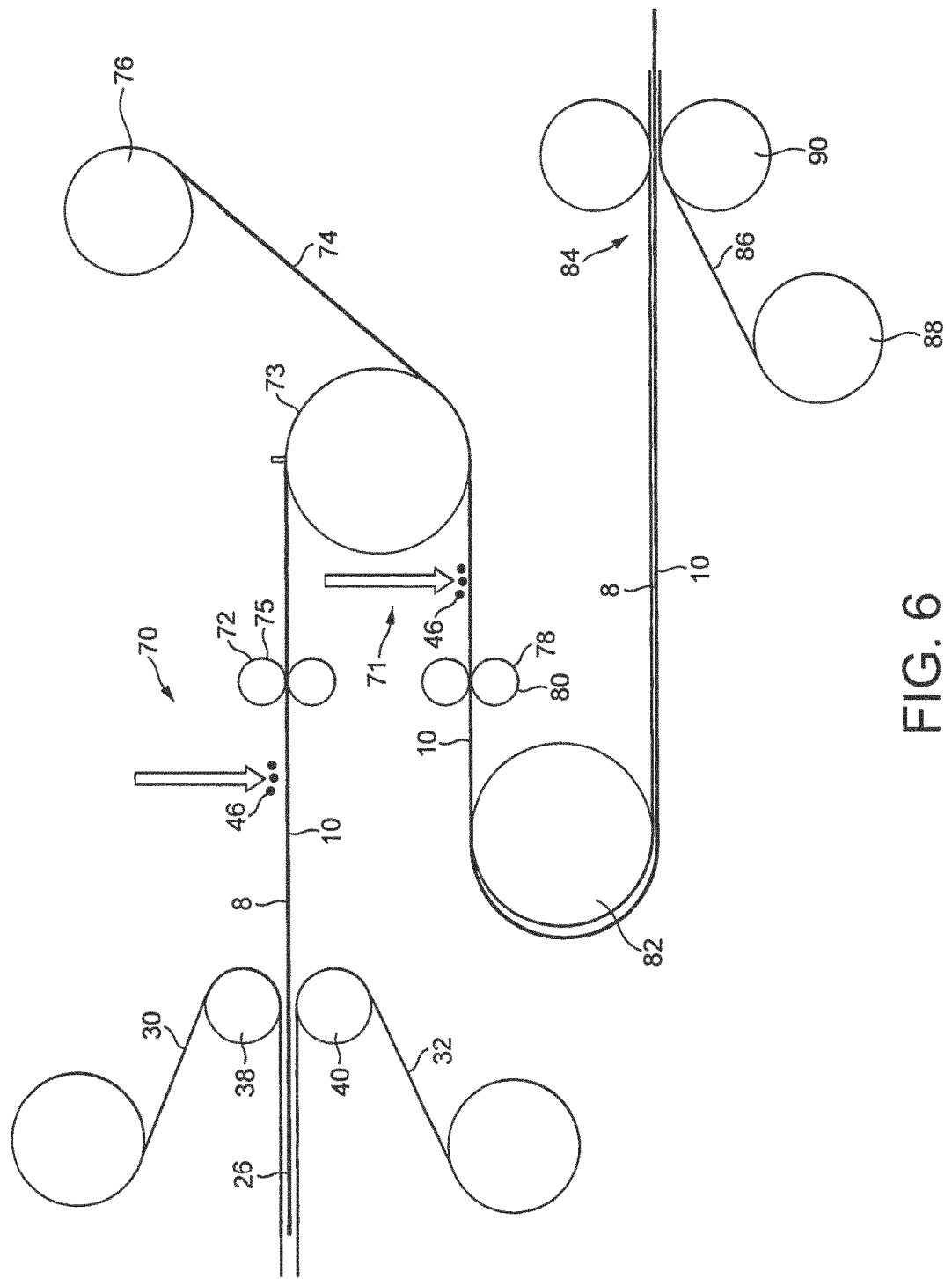
FIG. 6 is a schematic side view of another embodiment of an apparatus for the manufacture of a prepreg of FIG. 3.

Referring to FIG. 6, there is shown a schematic perspective drawing showing another embodiment of a method for the manufacture of the prepreg of FIG. 3. In the illustrated embodiment, as for the embodiment of FIG. 5, the prepreg 26, with protective paper sheets 30, 32 removed at the rollers 38, 40, and then the prepreg 26 is fed through two successive coating stations 70, 71.

At the first and second coating stations 70, 71, particles 46 of the powder coating of resin material are successively applied to the opposed major surfaces 8, 10 by a scattering the powder onto the surface 8, 10 under the action of gravity. After the upper surface 8 has been coated at the first coating station 70, the coated prepreg 26 then passes through a first pair of consolidating rollers 72 which are optionally heated and typically have a surface 75 composed of a releasable material such as PTFE. The consolidating rollers 72 apply pressure, and optional heat, to ensure that the particles 46 are securely adhered to the primary matrix resin surface 8 to form an even uniform coating layer. Then the prepreg 26 passes around a first inverting roller 73 so as to be rotated by an angle of 180 degrees, the previous lower surface 10 becoming the upper surface. At the first inverting roller 73 the radially outer powder coated surface 8 is covered by a first elongate backing web 74 of release material, such as silicone-coated paper or plastic material, e.g. polyethylene or polypropylene, which is applied to the powder coated surface 8. The backing web 74 is unwound from a reel 76.

The now-inverted upper surface 10 is then coated by particles 46 of the powder coating of resin material being applied to the surface 10 by scattering the powder onto the surface under the action of gravity at the second coating station 71. The double-sided powder coated prepreg 26 then passes through a second pair of consolidating rollers 78 which are optionally heated and typically have a surface 80 composed of a releasable material such as PTFE. The consolidating rollers 78 apply pressure, and optional heat, to ensure that the particles 46 are securely adhered to the primary matrix resin surface 10 to form an even uniform coating layer. Then the prepreg 26 passes around a second inverting roller 82 so as to be rotated by an angle of 180 degrees, the previous lower surface 8 again becoming the upper surface. The assembly of the double-sided powder coated prepreg 26 and the backing web 74 of release material is then conveyed to a backing layer applying station 84 at which a second elongate backing web 86 of release material, such as silicone-coated paper or plastic material, e.g. polyethylene or polypropylene, is applied to the powder coated surface 10. The backing web 86 is unwound from a respective reel 88 and the sandwich of first backing web 74, coated prepreg 2, second backing web 86 passes continuously between a pair of application rollers 90.

Figure 7:
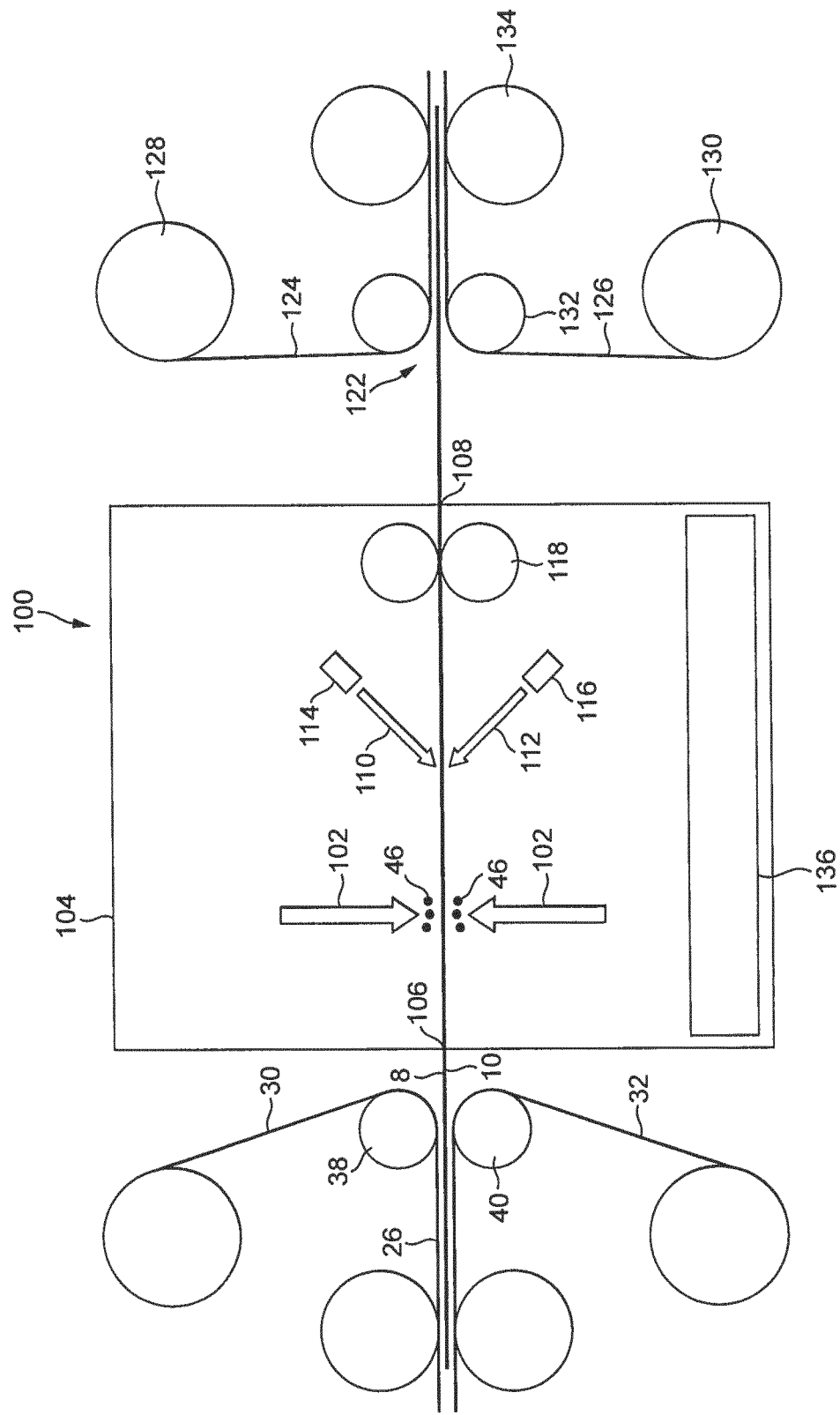
FIG. 7 is a schematic side view of a further embodiment of an apparatus for the manufacture of a prepreg of FIG. 3.

Referring to FIG. 7, there is shown a schematic perspective drawing showing a further embodiment of a method for the manufacture of the prepreg of FIG. 3. In the illustrated embodiment, as for the embodiment of FIG. 5, the prepreg 26, with protective paper sheets 30, 32 removed at the rollers 38, 40, is fed through a coating station 100 which simultaneously coats both surfaces 8, 10 with a respective powder coating layer.

At the coating station 100, particles 46 of the powder coating of resin material are simultaneously applied to the opposed major surfaces 8, 10 by respective triboelectrostatic spray guns 102, each of which sprays the powder onto a respective one of the opposed prepreg surfaces 8, 10. The triboelectrostatic spray guns 102 are located within a substantially closed spray booth 104 having upstream and downstream openings 106, 108 for receiving and outputting the prepreg 26. A collector 136 for overspray powder is provided at the bottom of the booth 104. Downstream of each triboelectrostatic spray gun 102 is a respective air jet 110, 112 from a respective nozzle 114, 116 which is directed towards a respective prepreg surface 8, 10 in a rearward, upstream orientation. The air jets 110, 112 urge the powder particles 46 upstream against the downstream conveying of the prepreg 26 so that the powder particles 46 are uniformly coated on the respective prepreg surfaces 8, 10.

The coated prepreg 26 then passes through a pair of consolidating rollers 118 which are optionally heated and typically have a surface 120 composed of a releasable material such as PTFE. The consolidating rollers 118 apply pressure, and optional heat, to ensure that the particles 46 are securely adhered to the primary matrix resin surfaces 8, 10 to form an even uniform coating layer.

Then the coated prepreg 26 is conveyed to a backing layer applying station 122 at which an elongate backing web 124, 126 of release material, such as silicone-coated paper or plastic material, e.g. polyethylene or polypropylene, is applied to each powder coated surface 8, 10. The backing webs 124, 126 are each unwound from a respective reel 128, 130 and the sandwich of backing web 124, coated prepreg 26, backing web 126 passes continuously between a pair of application rollers 132 and then through a pair of nip rollers 134.

In order to manufacture a fibre reinforced matrix resin composite material from the prepregs of the present invention, the prepregs are laminated as a stack and then subject to vacuum consolidation and curing.

During layup of the prepregs, as show in FIGS. 2 and 4 each powder coating layer is disposed adjacent to a powder coating layer or, if present, a surface of the primary matrix resin, of an adjacent prepreg of the stack. The resultant layup, particularly to form a spar, may comprise a single planar body, although other shapes and configurations may be employed. In order to modify the flexural modulus of the spar along its length, it is known to change the section width. In this case trapezium or triangular shaped sections, as well as parallel strips, may be also cut from the wider sheet to avoid wasting any of the prepreg material.

The powder coating layers of the prepreg have air transport properties so that when a multi-laminar stack of the prepregs is formed, and the multi-laminar stack is subjected to a vacuum in a consolidation step, air can readily be evacuated that is present near the surfaces of the prepregs and between the prepreg plies at the interfaces therebetween.

In particular, the resin of the powder coating layer is selected so as to have a relatively high viscosity and a relatively low tack to provide air passages between the adjacent prepregs which are retained during vacuum consolidation, whereas in comparison the primary matrix resin of the prepreg is selected so as to have a relatively low viscosity and a relatively high tack.

The combination of the primary matrix resin and unidirectional fibres is typically selected so as to provide a relatively high drapeability and low stiffness, in both (a) the longitudinal length direction, which is the direction of orientation of the unidirectional fibres, and (b) the transverse direction orthogonal thereto. The powder coating layers prevent the adjacent prepreg plies from prematurely bonding to each other or to mould surfaces, and may even permit the prepreg layers to slide over each other after layup, and the drapeability of the prepreg is not diminished by the presence of the powder coating layers.

The powder coating layer provides a surface roughness incorporating passages between the powder particles which enhances the creation and maintenance of separation between the primary matrix resin surfaces of adjacent prepreg plies in the layup stack. The passages act to provide air passages along the layup length and across the layup width which greatly increase air removal during vacuum consolidation. This in turn provides a reduced void content.

During subsequent curing when manufacturing the article of fibre reinforced resin matrix composite material, the prepregs are subjected to an elevated curing temperature. This causes both the matrix resin to flow and the resin particles to melt or dissolve into the resin matrix. The resin of the particles melts or dissolves into the matrix resin to form a resin mixture which at least in the outer surfaces of the prepregs is substantially homogeneous. This resin mixture then cures, and the resin of the particles co-cures with the matrix resin to form a cured co-polymer. Accordingly, in the final cured composite material the final cured resin matrix is a single phase, substantially homogeneous resin matrix having substantially uniform and high mechanical properties.

The prepregs of the present invention have particular application in the manufacture of carbon fibre or glass fibre sparcaps as part of a male moulded spar, comprising a spar and a shear web assembly, for wind turbine blades manufactured using prepregs in typical known blade manufacturing techniques. Alternatively, carbon fibre or glass fibre sparcaps may be formed as a discrete item, for example to be employed in combination with wind turbine blades manufactured using typical resin infusion. The prepregs of the present invention may also be used in other applications for the manufacture of thick section unidirectional fibre reinforced composite material laminates.

The prepreg of the present invention in particular allows the production of low void content carbon fibre laminates in male moulded sparcaps.

When manufacturing a product in which the elongate structural member is integrally formed within other composite laminate sections of the product, such as a wind turbine blade where each unidirectional spar is surrounded by biaxial composite material, the evacuation of air may be assisted by the stack of prepregs to form the elongate structural member being surrounded, during the vacuum consolidation phase, by dry fibrous reinforcement. These dry fibres have high permeability and permit the transport of trapped gasses back to the vacuum source in a large composite moulding. Such dry fibrous reinforcement may be present in a partially impregnated prepreg, such as a semipreg, or in a product such as the applicant's SPRINT® material, which comprises a discrete central resin layer with dry fibre outer surfaces.

When the prepregs are formed into a multi-laminar stack for forming a structural elongate member such as a spar, typically from 2 to 30 unidirectional prepreg layers are stacked to provide a thickness of uni-directional material. Depending on the spar design, multiaxial material is then added followed by repeat layers of the unidirectional prepreg, again another typically from 2 to 30 unidirectional prepreg layers being stacked to provide a further thickness of uni-directional material in the spar cap. This process can be repeated to give a final thickness in the ultimate spar cap from about 25 to 75 mm.

The aim is to maximise the amount of uni-directional material in the spar cap but to add the multi-axial fibres at strategic points to prevent the spar cap suffering a low transverse buckling resistance, provide sufficient shear transfer to the webs, and torsional rigidity, and to limit the thickness of uni-directional material to prevent shear cracking in the uni-directional stack, In general if glass fibre uni-directional prepreg is used the thickness of the uni-directional elements is larger than if carbon uni-directional pre-preg is used.

In a particularly preferred embodiment a spar for a wind turbine blade is manufactured, containing glass uni-directional sections formed from typically about 10-25 prepreg layers stacked together to provide a uni-directional thickness of from 10 to 30 mm and a final spar cap thickness of 20 to 100 mm. In another preferred embodiment a spar for a wind turbine blade is manufactured, the spar containing carbon uni-directional sections formed from typically about 6 to 40 prepreg layers stacked together to provide a uni-directional thickness of from 3 to 20 mm and a final thickness of 20 to 60 mm The present invention will now be described in greater detail with reference to the following non-limiting Examples.

Example 1

Figure 9:
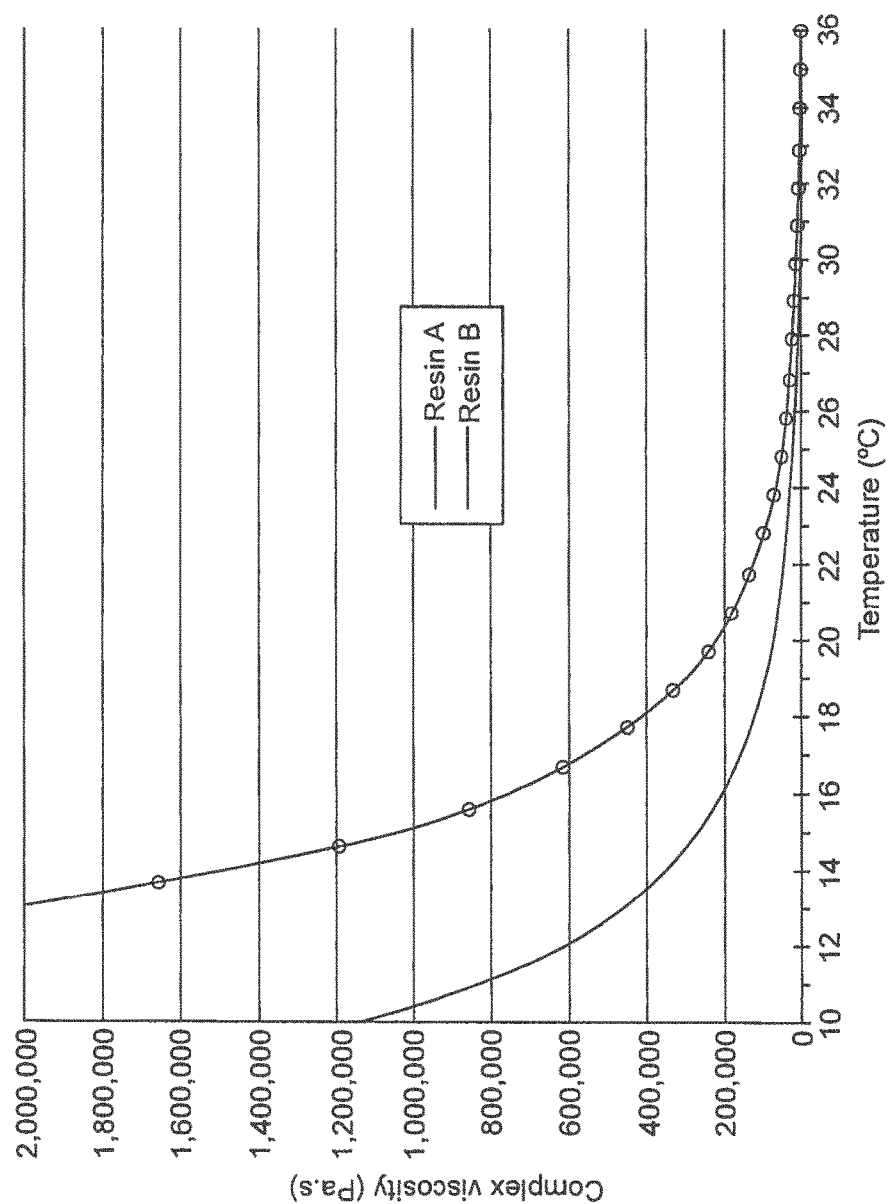
FIG. 9 is a graph showing the relationship between complex viscosity and temperature prepreg matrix resins used in Examples of the invention and Comparative Examples not according to the invention.
Figure 10:
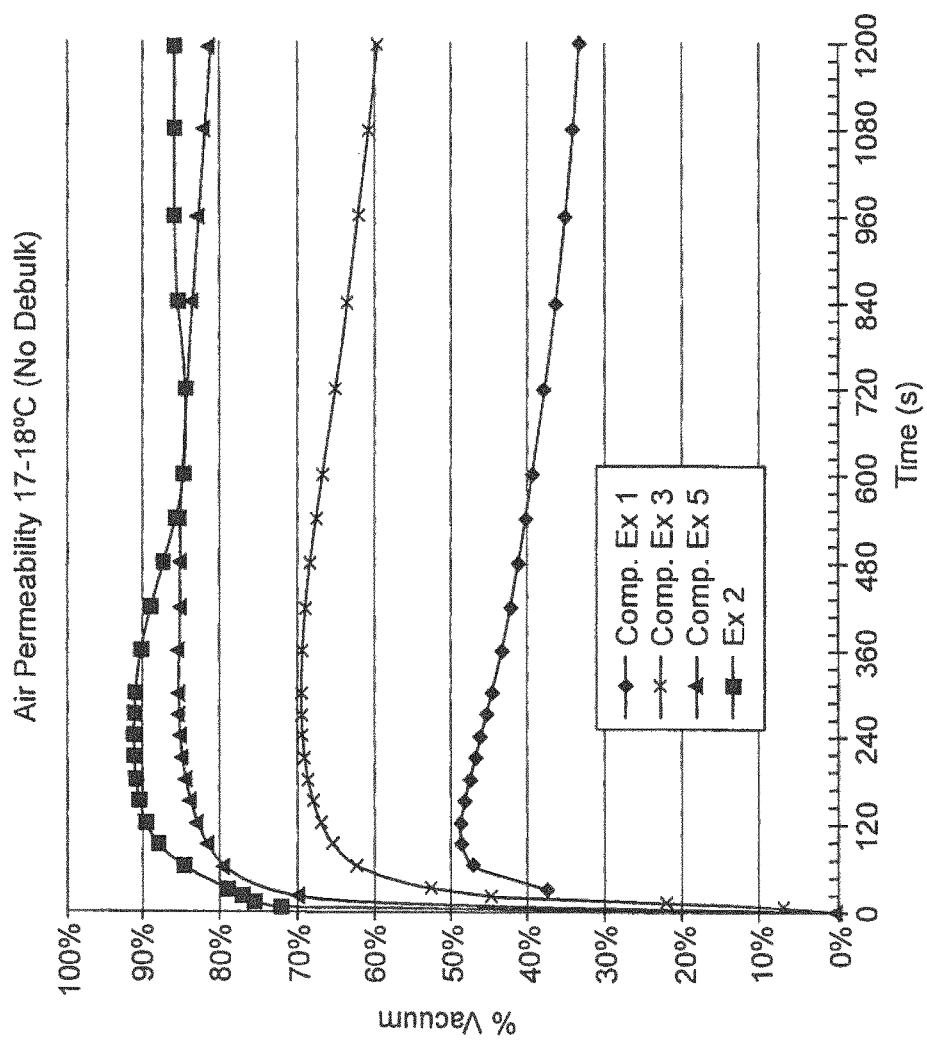
FIGS. 10 to 15 are graphs showing the relationship between air permeability and time for prepregs according to Examples of the invention and prepregs of Comparative Examples not according to the invention.
Figure 11:
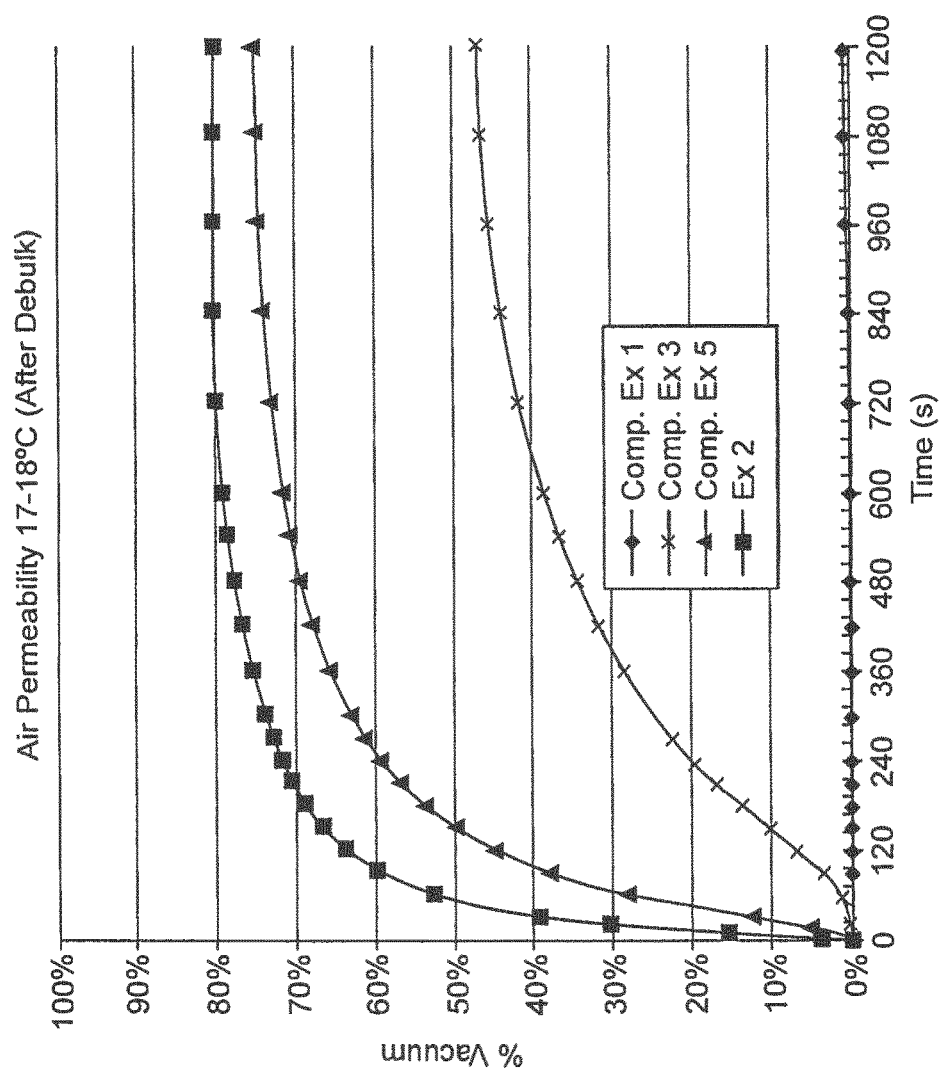
Figure 12:
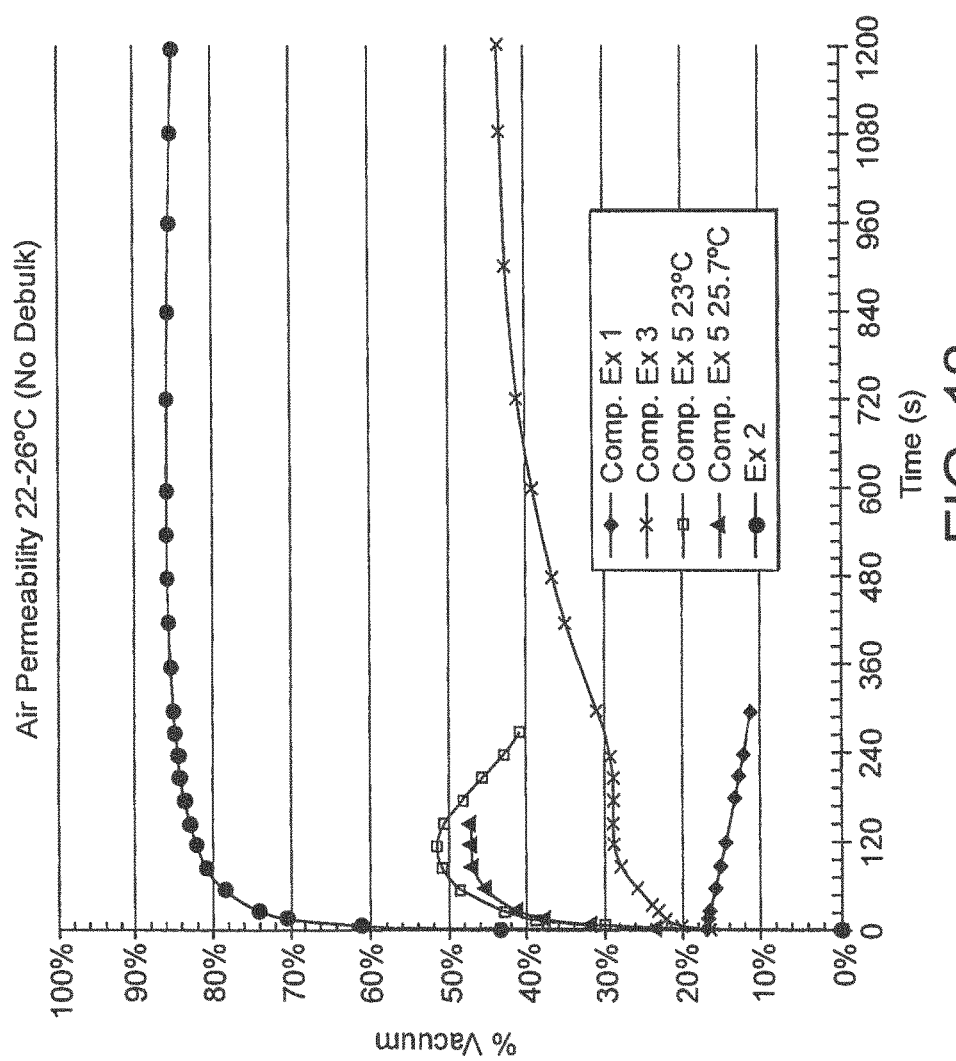

A fully impregnated carbon fibre prepreg having an epoxy matrix resin was manufactured. The carbon fibres were unidirectional (UD) fibres having a fibre weight of 600 grams per square meter. The prepreg had a resin content of 35% by weight, based on the weight of the prepreg. The epoxy resin was a commercially available prepreg resin, in particular a diglycidyl ether of bisphenol A (DGEBA) epoxy prepreg resin incorporating a dicyandiamide/urea curing system. The resin had low tack (Tack rating QC-2 at 20° C.). The resin is available in commerce from Gurit (UK) Limited, Newport, UK, under the trade name Gurit SPX17551. The epoxy matrix resin, designated as resin A, had the viscosity/temperature profile as shown in FIG. 9.

The tack rating is as follows: ZT—Zero Tack; QC-0 Does not stick at all. Surface dry to the touch; LT Low Tack—gloved finger easily removed after touching surface; QC-1 Sticks only with firm pressure. Parts very easily. Surface quite dry to the touch; QC-2 Sticks with medium pressure. Parts very easily. Surface has some stickiness; QC-3 Sticks with light pressure. Parts easily. Surface has some stickiness; MT-Medium Tack—gloved finger not easily removed after touching surface; QC-4 Sticks with little pressure. Parts easily. No fibre movement on parting; QC-5 Sticks with little pressure. Parts with some effort. Little fibre movement on parting; QC-6 Sticks with little/no pressure. Parts with some effort. Some fibre movement on parting; HT—High Tack—gloved finger left with resin on after touching surface; QC-7 Sticks with no pressure. Parts with effort. Fibre distorted on parting; QC-8 Sticks with no pressure. Parts with much effort. Fibre distortion on parting and resin "strings"; QC-9 Sticks with no pressure. Parts with much effort. High fibre distortion on parting and resin "strings"; XT—Extreme Tack—glove stretched or torn on attempting to remove it from the surface; QC-10 Sticks with no pressure. Cannot peel apart without destroying fabric/fibre alignment.

The production of a powder coating was as follows. A DGEBA epoxy resin having an epoxy equivalent weight of 510-570 gmol$^{-1}$ (measured according to EN ISO 3001) and a softening point of 74-82° C. (measured according to EN ISO 4625) was provided. The resin is available in commerce from Nan Ya Plastics Corporation of Taipei, Taiwan under the trade name NPES 601. The resin was ground to give a powder having a particle size of below 1000 microns and a bulk density of 656 kg/m$^3$. The powder was not calibrated into a controlled particle size.

The prepreg was initially weighed. The powder was applied by uniform scattering under gravity at 22° C. successively to both major surfaces of the prepreg. The excess powder was brushed from each surface to leave only fine powder adhered to the surface by the tack of the prepreg matrix resin. The powder coated prepreg was again weighed after each powder application to the respective surface. The powder coating was 5 grams per square meter on the each surface of the prepreg. The resulting prepreg was substantially coated and free from resin tack.

The powder coated prepreg was then tested to determine its drape limit, tack limit, void limit and temperature range for processing as described below.

To assess the temperature window for prepreg processing, the prepreg was subjected to tests at varying incremental temperatures to assess the drape, void level, and tack process limits for the prepreg material.

Drape Test

A mould with a saddle shape curvature was provided having a curvature selected so that when a prepreg is laid on the mould, the convex curvature induces progressively increasing strain between the prepreg fibres to induce wrinkling in the prepreg, and ply buckles in more rigid prepregs. The prepreg tested used to assess drape comprised a 300 mm wide roll of the carbon fibre prepreg. After allowing the prepreg material and mould to condition to the target lay-up temperature, 5 plies of the prepreg material were laminated onto the mould. After each ply had been draped onto the mould, it was inspected for fibre waviness, wrinkles and buckles. The temperature was progressively reduced to find the limit temperature at which fibre waviness, wrinkles or buckles were formed in the stack lay-up.

The results are shown in Table 1. The prepreg of Example 1 had a drape temperature limit of 16° C., which represented the minimum temperature that the laminate could be laid-up on the mould without encountering the formation of fibre waviness, wrinkles or buckles.

Tack Test

The tack of the prepreg was determined by manual touching and repositioning of the prepregs in a stack. The tack limit was determined as representing the maximum temperature that the prepreg could be handled in a lay-up on a mould without encountering resin surface stickiness or an inability to reposition the prepreg during the lay-up process.

The results are shown in Table 1. The prepreg of Example 1 had a tack limit of 36° C., which represented the maximum temperature that the laminate could be laid-up on the mould without encountering excessive tack.

Void Measurement Test

A Teflon covered aluminium mould plate was provided. After allowing the prepreg material and mould plate to condition to the target lay-up temperature, 20 rectangular plies of the UD prepreg, dimensioned 500 mm in the fibre direction and 300 mm in the transverse direction, were laminated in the 0 degree direction onto the mould plate. A central thermocouple was used to monitor the cure of the prepregs of the laminate stack. To simulate vacuum processing, as well known in the art, the stack was covered in an oversized layer of peel ply to provide the initial air connections to the stack top and ply edges. Perforated release film, breather fabric and a vacuum bag were fitted over the assembly. Pleats were used in the vacuum bag to accommodate for the height of the laminate stack. After checking for and correcting any vacuum leaks, the stack was kept under full vacuum for 1 hour.

The laid-up vacuum consolidated prepreg laminated panel was then subjected to resin cure at elevated temperature, the panel being placed into a fan assisted oven and cured using the following cure cycle: ramp up from lay-up temperature to 85° C. at 0.16° C./min; dwell for 6 hours; ramp up at 2° C./min to 120° C.; then cure for 3 hours.

The average void content of the resultant cured composite material was analysed using an optical method. A transverse section was taken at 200 mm from one edge and polished. Three digital images, each capturing an approximate 60 mm² area of laminate, were taken using an optical microscope with a digital camera. Struers Scentis image analysis software was used to first identify the void area using a digital contrast algorithm and with a manual verification step before calculating the percentage void area.

The void content was determined using a range of lay-up temperatures. The void limit was determined as the maximum lay-up temperature which was found to give less than 2% void content, which was considered to be an acceptable void level.

The results are shown in Table 1. The prepreg of Example 1 had a void limit of greater than 35° C., which represented the maximum temperature that the laminate could be laid-up on the mould without encountering excessive void content.

From the drape limit, tack limit and void limit test results of Example 1 as shown in Table 1, it may be seen that the powder coated prepreg of Example 1 had a temperature window for acceptable processing of from 16° C. to greater than 35° C.

Example 2

Example 2 produced a powder coated prepreg in a manner similar to Example 1. However, the prepreg matrix resin was different, and the amount of powder applied to the prepreg surfaces was modified.

The epoxy matrix resin of the prepreg was a commercially available prepreg resin, in particular a diglycidyl ether of bisphenol A (DGEBA) epoxy prepreg resin incorporating a dicyandiamide/urea curing system available in commerce from Gurit (UK) Limited, Newport, UK, under the trade name Gurit WE91-2. The resin had mid tack (Tack rating QC-3 at 22° C.). The epoxy matrix resin, designated as resin B, had the viscosity/temperature profile as shown in FIG. 9.

The powder coating was 7 grams per square meter on the each surface of the prepreg. The resulting prepreg was substantially coated and free from resin tack.

The powder coated prepreg was then tested to determine its drape limit, tack limit, void limit and temperature range for processing.

The results are shown in Table 1. The prepreg of Example 2 had a drape temperature limit of 10° C., a tack limit of 35° C., and a void limit of greater than 35° C., and correspondingly a temperature window for acceptable processing of from 10° C. to greater than 35° C.

The powder coated prepreg of Example 2 was also tested to determine its air permeability Air Permeability Test A test for in-plane permeability of the prepreg provided circular samples of the prepreg which were tested to quantify the relative air permeability during vacuum bag processing of the prepreg. The time taken to evacuate a fixed volume of air between two plies of the prepreg material was measured.

Figure 8:
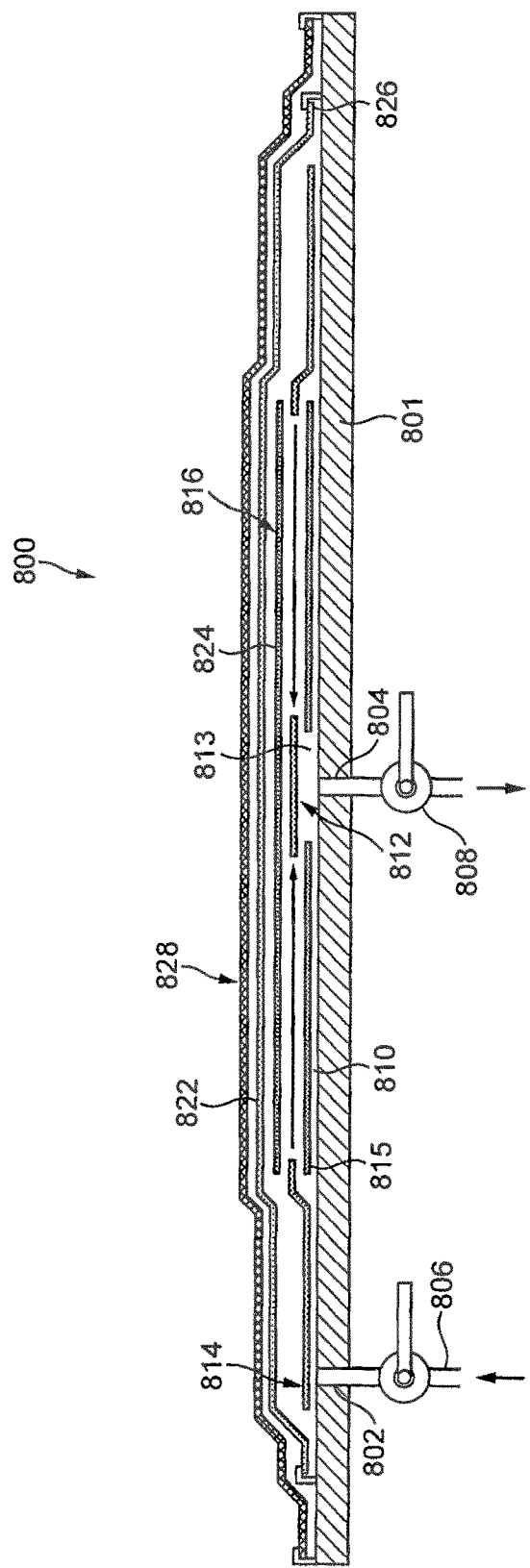
FIG. 8 is a schematic cross sectional drawing of an apparatus for testing the air permeability of a layup comprising a stack of two prepregs.

FIG. 8 shows a cross section of the apparatus 800 used to measure the radial in-plane permeability of the two ply prepreg laminate stack. The apparatus 800 comprises a flat aluminium plate 801 having a radially peripheral air inlet hole 802 and a central air outlet evacuation hole 804. A respective air conduit and air-tight control valve assembly 806, 808 is fitted to each hole 802, 804, and a respective pressure gauge (not shown) is provided to measure the pressure at the central and outer radial positions. A first annular prepreg material specimen 810 having an outer diameter of 250 mm and an inner diameter of 36 mm was placed such that the evacuation hole 804 was in the circular axial centre of the annular specimen 810. A 46 mm diameter disc 812 of highly air-permeable mesh material (available in commerce from Airtech under the trade name Breatherflow 20) was then centrally placed over the central circular opening 813 in the specimen 810. A larger annular disc 814 of the same highly permeable mesh material having outer diameter of 400 mm and an inner diameter of 240 mm was then paced centrally to overlap the peripheral circumferential edge 815 of the specimen 810. A second annular prepreg material specimen 816 having an outer diameter of 250 mm and an inner diameter of 36 mm was placed coaxially on top of the specimen 810 and the mesh discs 812, 814 such that the permeable mesh was located between the two prepreg material specimens 810, 816. The thickness of the mesh discs 812, 814 provided an air volume within the mesh material. The inlet and outlet holes 802, 804 are connected by the mesh discs 812, 814. The air volume in the outer mesh disc 814 must flow between the two prepreg material specimens 810, 816 to be evacuated from the outlet hole 804.

A non-porous self-adhesive layer 822 was placed on top of the prepreg stack 824 and a perimeter seal 826 applied, as is well known to those skilled in the art. Then a layer of breather fabric and an outer vacuum bag 828 were fitted, again as is well known to those skilled in the art.

This test assembly isolates a fixed volume of air in the outer radial mesh disc 814 which has to flow radially to the central outlet hole 804. By monitoring the pressure in the air conduit and air-tight control valve assemblies 806, 808 at the outer and central radial positions, the time to evacuate the prepreg material laminated stack and the relative permeability of the prepreg material can be determined.

Initially, the central and outer radial valve assemblies 806, 808 were opened to vent the prepreg material specimen stack 824 to atmospheric pressure. The valve assembly 806 for the inlet hole 802 was closed and then a vacuum was applied by a vacuum pump (not shown) connected to the central outlet hole 804, which then evacuated the outer bag 828 to simulate normal vacuum processing. The valve assemblies 806, 808 were then closed.

The outer radial inlet valve assembly 806 was then opened to allow air into the outer mesh disc 814 and then closed to seal a fixed volume of air in the bag 828 containing the prepreg material specimen stack 824. The valve assembly 808 isolating the central outlet hole 804 was then opened and the pressures at the outer inlet and central outlet holes 802, 804 monitored to record the pressure change with respect to the time to evacuate the system. Atmospheric air was then let back into the prepreg material specimen stack 824 and the test repeated to examine the air permeability after a fixed vacuum de-bulk cycle to assess how robust the material would be to consolidating forces that may locally close venting paths.

The air permeability results for Example 2, showing the relationship between % vacuum and time, for various temperatures and conditions are shown in Table 2 and FIGS. 10 to 13.

Figure 13:
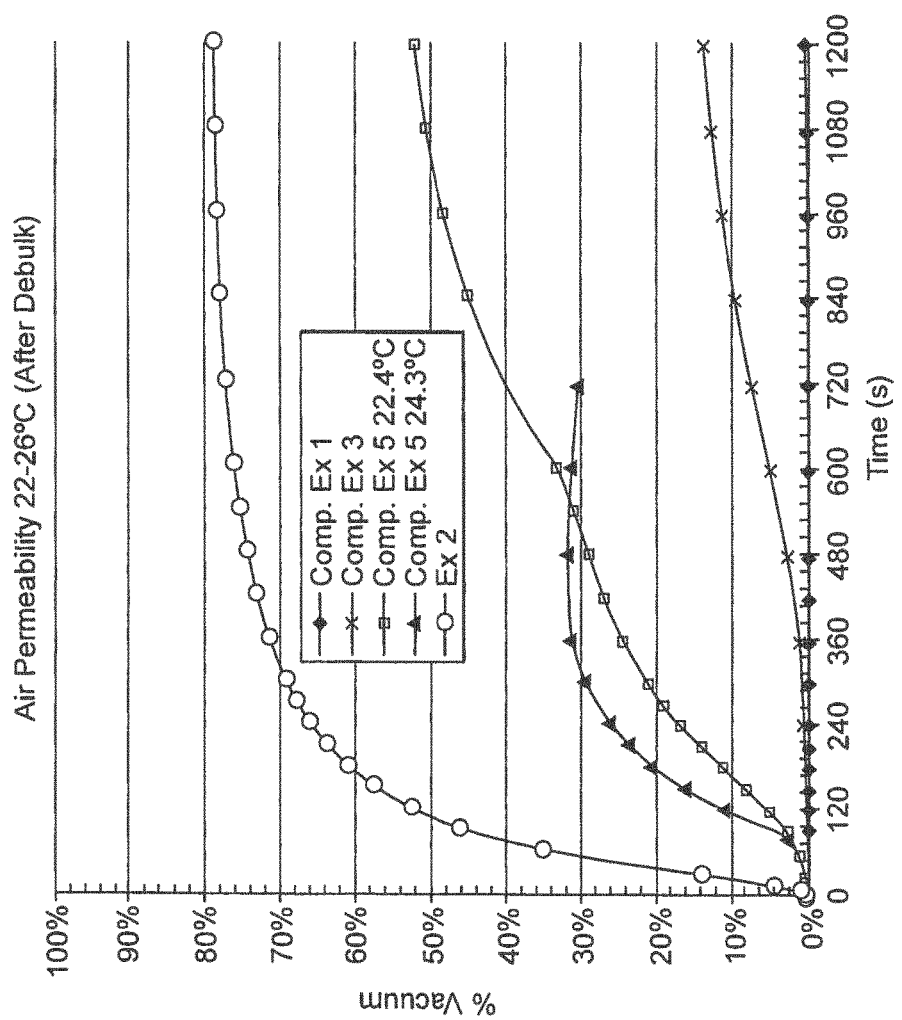

The air permeability test was carried out on the prepregs of Example 2 at a temperature of 17.6° C. without a vacuum de-bulk (FIG. 10) and at a temperature of 17.6° C. after a vacuum de-bulk (FIG. 11), and also at a temperature of 25.1° C. without a vacuum de-bulk (FIG. 12) and at a temperature of 25.5° C. after a vacuum de-bulk (FIG. 13).

It is seen that in these tests a high vacuum level was consistently reached, a high vacuum level indicating high air permeability of the interface between the resin plies.

Comparative Example 1

As Comparative Example 1, the prepreg of Example 1 was not coated with any resin powder and subjected to the same drape, tack and void tests as the prepreg of Example 1. The results are shown in Table 1. The prepreg of Comparative Example 1 had a drape temperature limit of 16° C., a tack limit of 27° C., and a void limit of 18° C. In other words, a comparison of Example 1 and Comparative Example 1 shows that the addition of the powder coating onto the prepreg surfaces decreased the tack and decreased the void content, while the drape remained the same. The prepreg of Comparative Example 1 had a smaller temperature window for acceptable processing of from 16° C. to 18° C.

Therefore the addition of the powder coating to the prepreg increased with processing temperature window of the prepreg.

The air permeability test was carried out on the prepregs of Comparative Example 1 at a temperature of 18.1° C. without a vacuum de-bulk (FIG. 10) and at a temperature of 17.3° C. after a vacuum de-bulk (FIG. 11), and also at a temperature of 24.1° C. without a vacuum de-bulk (FIG. 12) and at a temperature of 24.1° C. after a vacuum de-bulk (FIG. 13). The results are shown in Table 2.

Comparative Example 2

As Comparative Example 2, the prepreg of Example 2 was not coated with any resin powder and subjected to the same drape, tack and void tests as the prepreg of Example 2.

The results are shown in Table 1. The prepreg of Comparative Example 1 had a drape temperature limit of 10° C., a tack limit of 24° C., and a void limit of 12° C.

In other words, a comparison of Example 2 and Comparative Example 2 shows that the addition of the powder coating onto the prepreg surfaces decreased the tack and decreased the void content, while the drape remained the same. The prepreg of Comparative Example 1 had a smaller temperature window for acceptable processing of from 10° C. to 12° C.

Comparative Example 3

Figure 16:
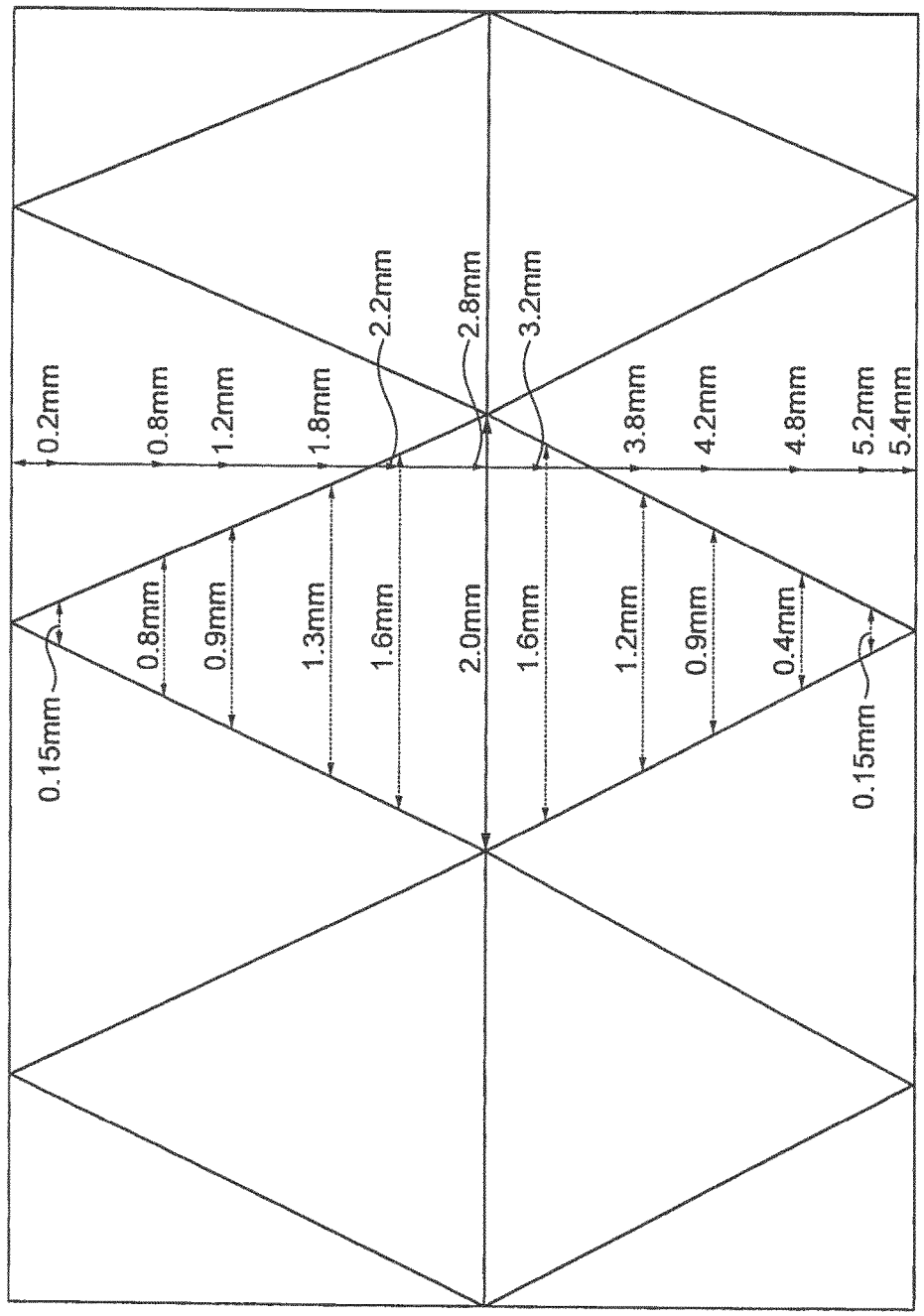

As Comparative Example 3, the prepreg of Example 2, including matrix resin B, was not coated with any resin powder. Instead, the prepreg major surfaces were covered with a PVAC-bonded polyester scrim, having a fabric weight of 3.3 g/m², and fibrous structure as illustrated in FIG. 16, as generally disclosed in EP-A-1595689. The scrim coated prepreg was subjected to the same drape, tack and void tests as the prepreg of Example 2, and the results are shown in Table 1. The prepreg of Comparative Example 3 had a drape temperature limit of 10° C., a tack limit of 24° C., and a void limit of 31° C. In other words, a comparison of Example 2 and Comparative Example 3 shows that the addition of the powder according to the invention onto the prepreg surfaces instead of the known polyester scrim decreased the tack and decreased the void content while the drape remained the same. The prepreg of Comparative Example 3 had a smaller temperature window for acceptable processing of from 10° C. to 24° C. as compared to Example 2 which had a range of from 10° C. to greater than 35° C.

Figure 14:
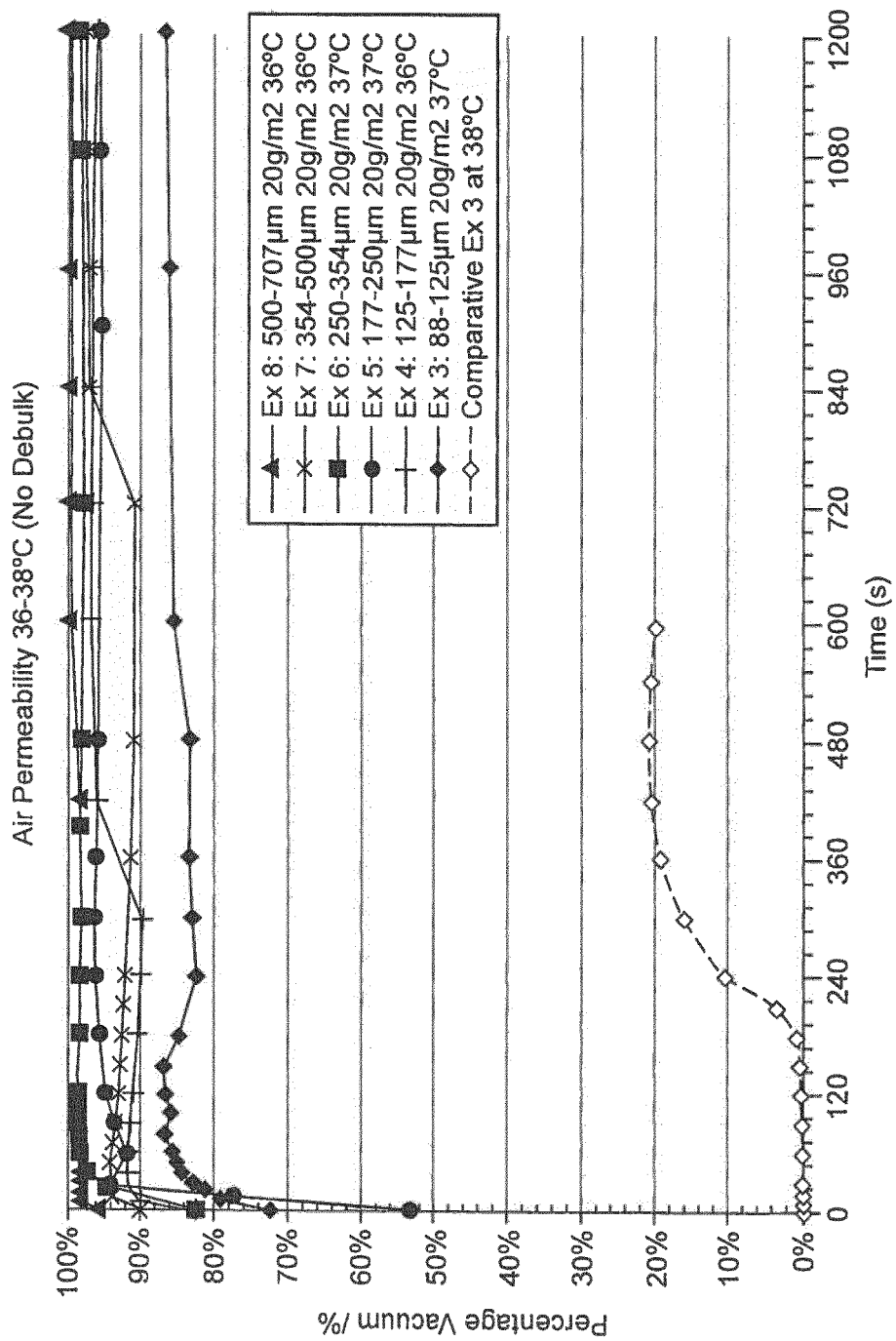
Figure 15:
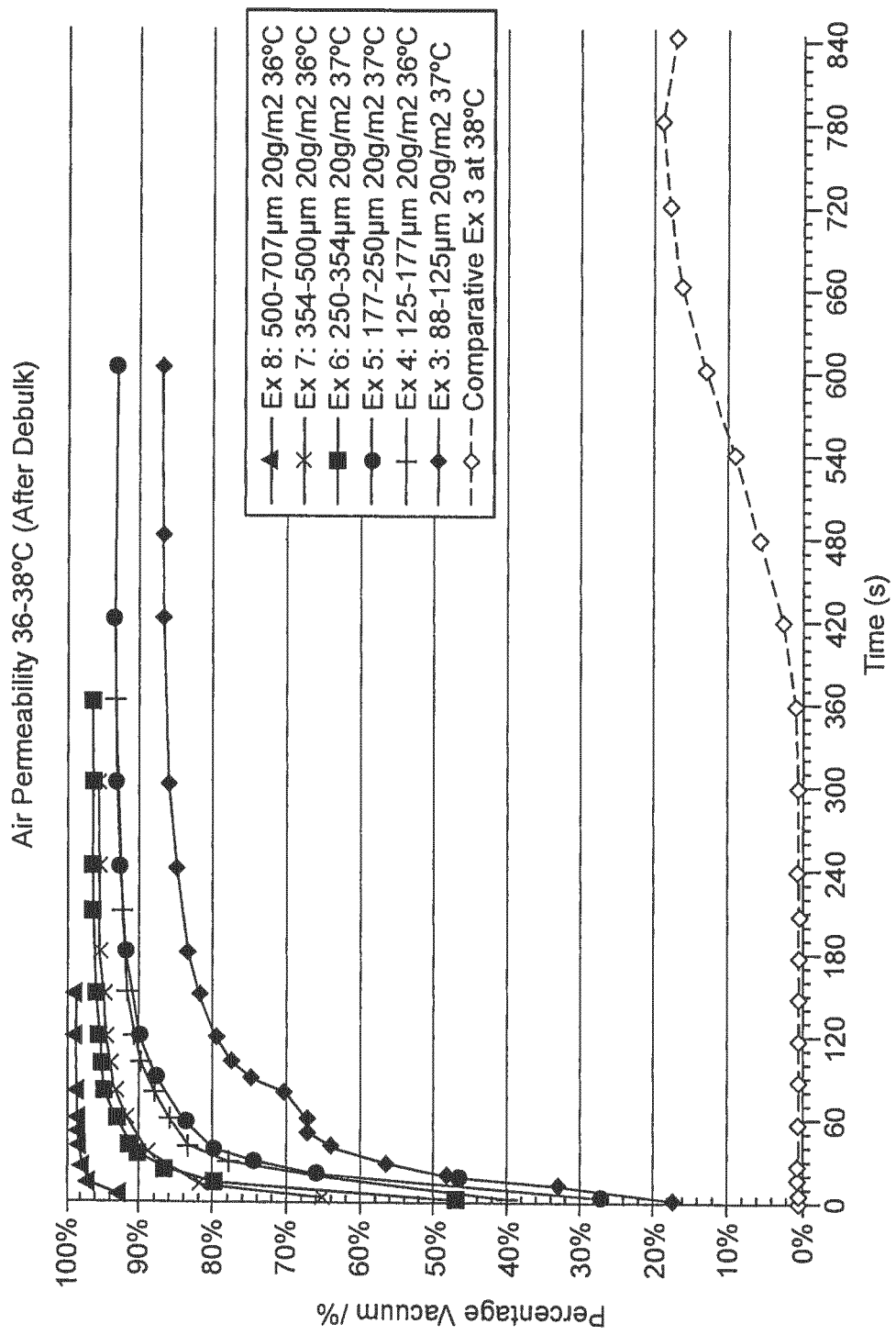

The air permeability test was carried out on the prepregs of Comparative Example 3 at a temperature of 17.7° C. without a vacuum de-bulk (FIG. 10) and at a temperature of 18° C. after a vacuum de-bulk (FIG. 11), and also at a temperature of 24.9° C. without a vacuum de-bulk (FIG. 12) and at a temperature of 22.4° C. after a vacuum de-bulk (FIG. 13), and also at a temperature of 38.0° C. without a vacuum de-bulk (FIG. 14) and at a temperature of 38.0° C. after a vacuum de-bulk (FIG. 15). The results are shown in Table 2.

Comparative Examples 4 and 5

As Comparative Example 4, the prepreg of Example 1, including matrix resin A, was not coated with any resin powder. Instead, during manufacture of the prepreg, in which two resin films were impregnated into opposite sides of a central fabric layer, one of the resin films was applied as parallel stripes. In the resultant prepreg, one prepreg surface had parallel bands of unimpregnated fibres. The bands had a width of 6 mm and were spaced at 40 mm centres. Such a prepreg structure is disclosed generally in WO-A-2012/052272 in the name of Gurit (UK) Limited.

Both of the prepreg major surfaces were also covered with a PVAC-bonded polyester scrim as used in Comparative Example 3. The scrim coated prepreg with dry fabric channel areas was subjected to the same drape, tack and void tests as the prepreg of Example 1, and the results are shown in Table 1. The prepreg of Comparative Example 4 had a drape temperature limit of 16° C., a tack limit of 27° C., and a void limit of 33° C.

In other words, a comparison of Example 1 and Comparative Example 4 shows that the addition of the powder according to the invention onto the prepreg surfaces instead of the combination of known polyester scrim and dry fibre channels decreased the tack and decreased the void content while the drape remained the same. The prepreg of Comparative Example 4 had a smaller temperature window for acceptable processing of from 16° C. to 27° C. as compared to Example 1 which had a range of from 16° C. to greater than 35° C.

The prepreg of Comparative Example 5 was the same as that of Comparative Example 4 except including matrix resin B rather than matrix resin A.

The air permeability test was carried out on the prepregs of Comparative Example 5 at a temperature of 17.8° C. without a vacuum de-bulk (FIG. 10) and at a temperature of 17.6° C. after a vacuum de-bulk (FIG. 11), and also at temperatures of 23 and 25.7° C. without a vacuum de-bulk (FIG. 12) and at a temperatures of 22.4 and 24.3° C. after a vacuum de-bulk (FIG. 13). The results are shown in Table 2.

Examples 3 to 8

Examples 3 to 8 each produced a powder coated prepreg in a manner similar to Example 2. However, the prepreg matrix resin was different, the powder particle size was different, the amount of powder applied to the prepreg surfaces was modified, and the powder application process and conditions were modified.

The prepreg was the same as that of Example 2, incorporating the epoxy matrix resin designated as resin B.

The production of a powder coating was as follows. A DGEBA epoxy resin having an epoxy equivalent weight of 840-900 gmol$^{-1}$ (measured according to EN ISO 3001) and a softening point of 110-112° C. (measured according to EN ISO 4625) was provided. The resin is available in commerce from Nan Ya Plastics Corporation of Taipei, Taiwan under the trade name NPES 904H. The resin was ground to give a powder and then calibrated into a series of set particle size ranges using a series of woven wire mesh sieves conforming to IOS 3310.

Example 3 had a particle size of 88-125 microns. Example 4 had a particle size of 125-177 microns. Example 5 had a particle size of 177-250 microns. Example 6 had a particle size of 250-354 microns. Example 7 had a particle size of 354-500 microns. Example 8 had a particle size of 500-707 microns.

The particulate powder was scattered onto each prepreg major surface. In each Example, the powder coating was 20 grams per square meter on the each surface of the prepreg.

Figure 17:
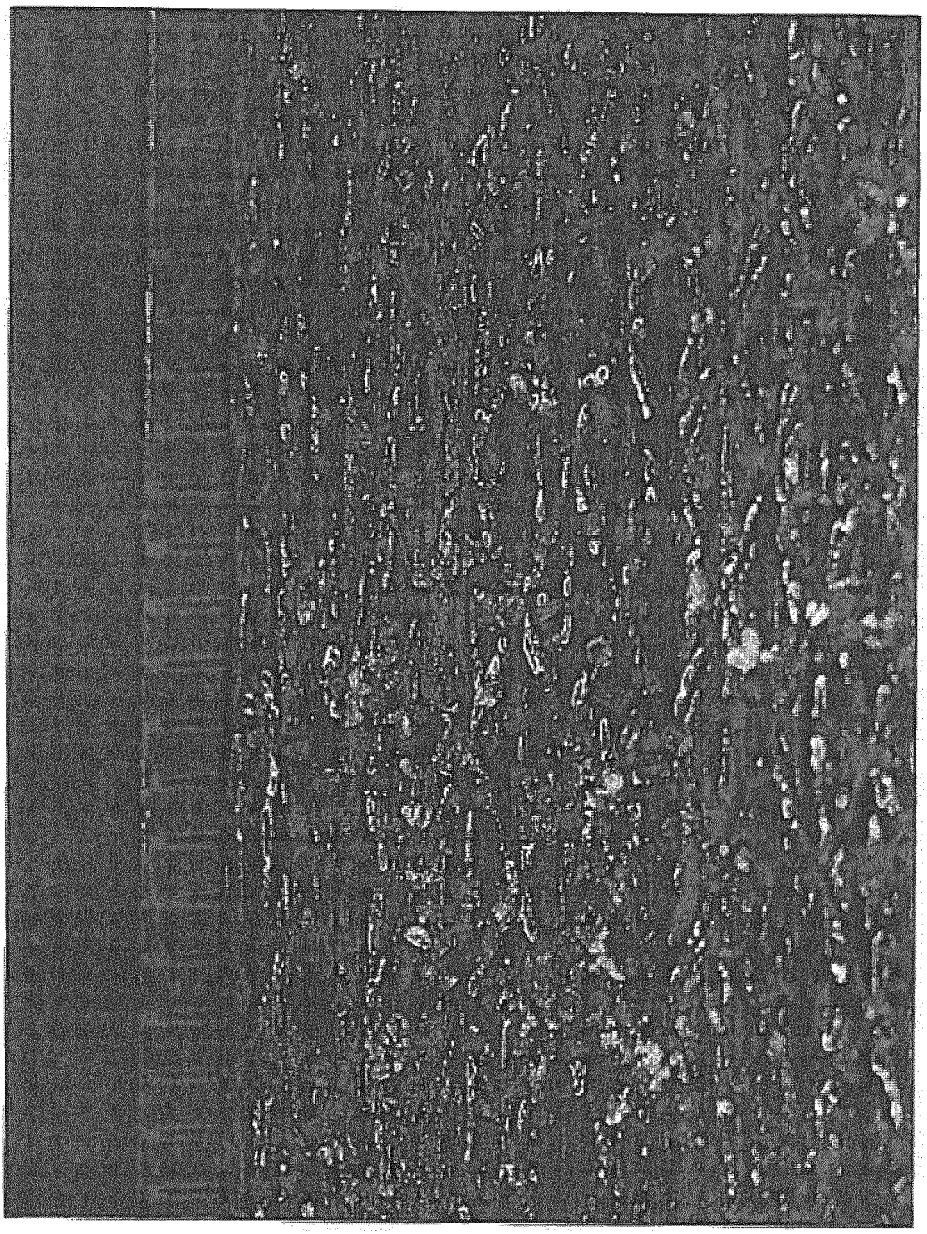
FIG. 17 is a photomicrograph showing a perspective view of a prepreg coated with a powder coating layer according to an embodiment of the present invention.

FIG. 17 is a photomicrograph showing a perspective view of a prepreg coated with a powder coating layer according to an embodiment of the present invention. The image is taken with the prepreg at an inclined angle to give better side perspective of the particles projecting out of the surface of, and partly embedded in, the matrix resin. Due a limited depth of field in the photomicrograph, the image is slightly out of focus at the near edge (at the bottom of the image). In this example the prepreg includes a matrix resin of Resin B like Examples 3 to 8 and the power particles are applied at a coating weight of 20 gsm and comprise powder CHS-Epoxy 160, with a particle size calibrated to be from 250 to 500 microns. CHS-Epoxy 160 is a DGEBA epoxy resin having an epoxy equivalent weight of 600-650 gmol$^{-1}$ (measured according to EN ISO 3001) and a softening point of 83-93° C. (measured according to EN ISO 4625) and is available in commerce from Spolchemie, Czech Republic under the trade name CHS-Epoxy 160. The ruler marks are at 1 mm spacing. The diamond pattern in the matrix resin surface is the original texture, including recessed lines formed in the surface of the matrix resin, which were impressed by an embossed polyethylene backer covering the surfaces of the initial prepreg prior to powder coating. The powder coating in this embodiment forms a discontinuous particle layer on the matrix resin surface, although in other embodiments the particle layer may be continuous.

Referring back to Examples 3 to 8, after application of the powder coating, each coated surface was covered with a polymeric backing layer and a consolidation pressure of 1 bar was applied at an ambient temperature of 23° C. for 2 minutes to press the powder onto the prepreg surfaces. The resulting prepreg was substantially coated and free from resin tack. The powder particles were partly pressed into, and projected above, the matrix resin surface by the applied consolidation pressure.

The powder coated prepreg of these Examples was then tested to determine its drape limit, tack limit, void limit and temperature range for processing.

The results are shown in Table 1. The prepreg of Examples 3 to 8 all had a drape temperature limit of 10° C., a tack limit of greater than 38° C., and a void limit of greater than 38° C., and correspondingly a temperature window for acceptable processing of from 10° C. to greater than 38° C.

The powder coated prepreg of Examples 3 to 8 were also tested to determine their air permeability.

The air permeability results for Examples 3 to 8, showing the relationship between % vacuum and time, for various temperatures and conditions are shown in Table 2 and FIGS. 14 and 15.

The air permeability test was carried out on the prepregs of Examples 3 to 8 at a temperature of 36 or 37° C. both without a vacuum de-bulk (FIG. 14) and after a vacuum de-bulk (FIG. 15).

It is seen that in these tests a high vacuum level was consistently reached, a high vacuum level indicating high air permeability of the interface between the resin plies.

Examples 9 to 11

Examples 9 to 11 each produced a powder coated prepreg in a manner similar to Example 2. However, the prepreg matrix resin was different, the powder particle size was different, the amount of powder applied to the prepreg surfaces was modified, and the powder application process and conditions were modified.

The prepreg was the same as that of Example 2, incorporating the epoxy matrix resin designated as resin B.

The production of a powder coating was as follows. A DGEBA epoxy resin having an epoxy equivalent weight of 600-650 gmol$^{-1}$ (measured according to EN ISO 3001) and a softening point of 83-93° C. (measured according to EN ISO 4625) was provided. The resin is available in commerce from Spolchemie, Czech Republic under the trade name CHS-Epoxy 160. The resin was ground to give a powder and then calibrated into a series of set particle size ranges using a series of woven wire mesh sieves conforming to IOS 3310.

Example 9 had a particle size of 250-354 microns. Example 10 had a particle size of 354-500 microns. Example 11 had a particle size of 500-707 microns.

The particulate powder was scattered onto each prepreg major surface. In each Example, the powder coating was 20 grams per square meter on the each surface of the prepreg.

After application of the powder coating, each coated surface was covered with a polymeric backing layer and a consolidation pressure of 1 bar was applied at an ambient temperature of 23° C. for 2 minutes to press the powder onto the prepreg surfaces. The resulting prepreg was substantially coated and free from resin tack. The powder particles were partly pressed into, and projected above, the matrix resin surface by the applied consolidation pressure.

The powder coated prepreg of these Examples was then tested to determine its drape limit, tack limit, void limit and temperature range for processing.

The results are shown in Table 1. The prepreg of Examples 9 to 11 all had a drape temperature limit of 10° C., a tack limit of greater than 38° C., and a void limit of greater than 38° C., and correspondingly a temperature window for acceptable processing of from 10° C. to greater than 38° C.

Comparative Example 6

As Comparative Example 6, talc was applied to the resin surface of the prepreg of Comparative Example 1. The talc had a particle size range between 0.07 and 4 micron and provided poor breathing of a laminate stack and the talc particles were quickly wet out by resin during storage of the talc-coated prepreg.

Comparative Example 7

As Comparative Example 7, glass spheres, such a product being available in commerce from 3M under the trade name K20, were applied to the resin surface of the prepreg of Comparative Example 1. The manufacturer's particle specification for this grade was d(0.1)=30 microns, d(0.5)=60, d(0.9)=90 microns. Tack and void levels were reduced below 30° C. but the glass spheres produced higher void levels with poor breathing of a laminate stack above 30° C. The glass spheres were wet out by resin during storage of the glass sphere-coated prepreg.

Comparative Example 8

As Comparative Example 8, dicyandiamide particles with d(0.5) of 1-2 microns, d(0.9)<less than 5 microns were applied to the resin surface of the prepreg of Comparative Example 1. The dicyandiamide particles provided poor breathing of a laminate stack and the dicyandiamide particles were quickly wet out by resin during storage of the dicyandiamide particle-coated prepreg.

It should be noted that the Comparative Examples all showed a large drop in permeability after the de-bulk cycle indicating that they are sensitive to pressure application. This may lead to an enhanced risk of defects resulting from by localised higher pressures, for example at prepreg Bridging points, prepreg panel edges), and if the cure cycle is stopped and restarted. The preferred resin materials for the powder coating can maintain permeability even after a de-bulk cycle.

Examples 12 and 13

A unidirectional carbon fibre prepreg comprising an epoxy resin matrix material (SE84LV) was coated with a selection of thermoplastics as listed in Table 3. The coating weight was from 5 to 40 g/m$^2$. One side of the prepreg was coated to ensure the material had sufficient tack to create a laminate. All laminate were cured for one hour at 120 C using vacuum bag curing.

The resultant toughness, as measured by the GIC and/or GIIC experiments, is also shown in Table 3.

It may be seen that the thermoplastic toughening additive particles significantly increased the fracture toughness of the resultant composite material.

TABLE 1

| | Resin | Format | Drape Limit ° C. | Tack Limit ° C. | Void Limit ° C. | Process Window ° C. |
|---|---|---|---|---|---|---|
| Comp. Ex. 1 | A | Standard prepreg/No powder | 16 | 27 | 18 | 16-18 |
| Comp. Ex. 2 | B | Standard prepreg/No powder | 10 | 24 | 12 | 10-12 |
| Comp. Ex. 3 | B | Scrim both sides/No powder | 10 | 24 | 31 | 10-24 |
| Comp. Ex. 4 | A | Dry channels one side/Scrim both sides/No powder | 16 | 27 | 33 | 16-27 |
| Example 1 | A | 2 × 5 gsm Powder (Not calibrated) | 16 | 36 | >35 | 16-35+ |
| Example 2 | B | 2 × 7 g/m2 (Not calibrated) | 10 | 35 | >35 | 10-35+ |
| Example 6 | B | 2 × (250-354 μm 20 g/m2) | 10 | >38 | >38 | 10-38+ |
| Example 7 | B | 2 × (354-500 μm 20 g/m2) | 10 | >38 | >38 | 10-38+ |
| Example 8 | B | 2 × (500-707 μm 20 g/m2) | 10 | >38 | >38 | 10-38+ |
| Example 9 | B | 2 × (250-354 μm 20 g/m2) | 10 | >38 | >38 | 10-38+ |
| Example 10 | B | 2 × (354-500 μm 20 g/m2) | 10 | >38 | >38 | 10-38+ |
| Example 11 | B | 2 × (500-707 μm 20 g/m2) | 10 | >38 | >38 | 10-38+ |

TABLE 2

| | Resin | Prepreg Format | Test Temp. 17-18° C. | | Test Temp. 22-26° C. | | Test Temp. 36-38° C. | |
|---|---|---|---|---|---|---|---|---|
| | | | Before De-bulk | After 20 min De-bulk | Before De-bulk | After 20 min De-bulk | Before De-bulk | After 20 min De-bulk |
| Comp. Ex. 1 | A | Standard prepreg/No powder | 49.0% | 0.8% | 17.2% | 0.0% | 0.0% | 0.0% |

TABLE 2-continued

| | Resin | Prepreg Format | Test Temp. 17-18° C. Before De-bulk | Test Temp. 17-18° C. After 20 min De-bulk | Test Temp. 22-26° C. Before De-bulk | Test Temp. 22-26° C. After 20 min De-bulk | Test Temp. 36-38° C. Before De-bulk | Test Temp. 36-38° C. After 20 min De-bulk |
|---|---|---|---|---|---|---|---|---|
| Comp. Ex. 2 | B | Standard prepreg/No powder | | | 0.0% | 0.0% | 0.0% | 0.0% |
| Comp. Ex. 3 | B | Scrim both sides/No powder | 69.6% | 47.1% | 43.0% | 14.6% | 21.0% | 18.8% |
| Comp. Ex. 5 | B | Dry channels one side/Scrim both sides/No powder | 85.3% | 75.3% | 52.1% | 53.0% | | |
| Ex. 2 | B | 2 × 7 gsm (Not calibrated) | 91.6% | 80.3% | 85.9% | 78.5% | | |
| Ex. 3 | B | 2 × (88-125 μm 20 g/m2) | | | | | 86.9% | 87.7% |
| Ex. 4 | B | 2 × (125-177 μm 20 g/m2) | | | | | 96.4% | 94.0% |
| Ex. 5 | B | 2 × (177-250 μm 20 g/m2) | | | | | 96.0% | 94.1% |
| Ex. 6 | B | 2 × (250-354 μm 20 g/m2) | | | | | 98.6% | 97.2% |
| Ex. 7 | B | 2 × (354-500 μm 20 g/m2) | | | | | 96.9% | 96.1% |
| Ex. 8 | B | 2 × (500-707 μm 20 g/m2) | | | | | 99.4% | 99.4% |

TABLE 3

| | Particle | Particle Size | Melting Point | Toughness |
|---|---|---|---|---|
| Example 12 | Phenoxy thermoplastic | 110-200 micron | ~110° C. | 50% increase in GIC as compared to same prepreg without particle coating |
| Example 13 | Nitrile rubber | 50 micron (median) | >160° C. | 50-200% increase in GIIC (higher with higher coating weights) as compared to same prepreg without particle coating |

The invention claimed is:

1. A prepreg for manufacturing a fibre-reinforced composite material, the prepreg comprising a body comprising a layer of fibrous reinforcement impregnated with a matrix resin material, and a powder coating layer on at least one major surface of the body and adhered to the matrix resin material, the powder coating layer including particles projecting outwardly from the matrix resin material and being porous to air flow in a direction along the plane of the powder coating layer, and wherein the particles comprise a resin material which co-polymerisable with the matrix resin material.

2. A prepreg according to claim 1 wherein the body has two opposed major surfaces and the powder coating layer is on both major surfaces.

3. A prepreg according to claim 1 wherein the powder coating layer substantially covers the at least one major surface.

4. A prepreg according to claim 1 wherein the powder coating layer partly covers the at least one major surface and leaves at least some uncovered areas which expose the matrix resin material.

5. A prepreg according to claim 4 wherein the uncovered areas are arranged in a mutually spaced array.

6. A prepreg according to claim 1 wherein the layer of fibrous reinforcement is fully impregnated by the matrix resin material.

7. A prepreg according to claim 1 wherein the prepreg is elongate and extends in a longitudinal direction and the layer of fibrous reinforcement is a unidirectional fibrous reinforcement extending in the longitudinal direction of the prepreg.

8. A prepreg according to claim 1 wherein the powder coating layer includes particles having a particle size of from 25 to 2000 microns.

9. A prepreg according to claim 8 wherein at least 50% of the particles of the powder coating layer are particles having a particle size of from 25 to 2000 microns.

10. A prepreg according to claim 1 wherein the powder coating layer has a coating weight of from 5 to 50 grams per square meter.

11. A prepreg according to claim 1 wherein the powder coating layer comprises substantially a monolayer of powder particles on the major surface of the body, the monolayer being optionally continuous or discontinuous.

12. A prepreg according to claim 1 wherein the powder coating layer comprises powder particles partly embedded into the matrix resin material at the major surface of the body.

13. A prepreg according to claim 1 wherein the powder coating layer comprises powder particles having a coating weight of from 15 to 25 grams per square meter of particles having a particle size of from 250-500 microns.

14. A prepreg according to claim 1 wherein the matrix resin material and the resin material of the powder coating are both composed of a thermosetting resin.

15. A prepreg according to claim 1 wherein the resin of the particles and the matrix resin when cured form a single phase cured resin matrix.

16. A prepreg according to claim 1 wherein when both the resin material of the powder coating and the matrix resin material are in a molten state, the resin material of the powder coating is soluble in the matrix resin material.

17. A prepreg according to claim 1 wherein the matrix resin material and the resin material of the powder coating are each epoxy resin.

18. A prepreg according to claim 1 wherein the resin material of the powder coating has a higher melting point than the matrix resin material, optionally wherein the melting point of the powder is below 85° C.

19. A prepreg according to claim 1 wherein the resin material of the powder coating has a higher Tg than the matrix resin material.

20. A prepreg according to claim 1 wherein for at least a majority of the particles in the powder coating layer, greater than 50% of the particle height is exposed above the matrix resin surface.

21. A prepreg according to claim 1 wherein the powder coating layer comprises a toughening additive material which is dispersible into a surface region of the matrix resin material during processing of the prepreg when manufacturing the fibre-reinforced composite material.

22. A prepreg according to claim 21 wherein the toughening additive material is comprised of a polymeric resin selected from at least one or more of a thermoplastic resin and an elastomeric rubber.

23. A prepreg according to claim 22 wherein the toughening additive material is comprised of one or more materials selected from block copolymers, polyimides, polyether imides, polyether sulfones, polyarylates, polyphenylene oxides, polyether ether ketones, polyphenylsulfones, acrylic rubbers, silicone rubbers, phenoxy thermoplastics, polyesters, nitrile rubbers, or other polymeric resin particles known to toughen thermoset composite materials.

24. A prepreg according to claim 21 wherein the toughening additive material is blended with a resin material which is co-polymerisable with the matrix resin material.

25. A prepreg according to claim 21 wherein the toughening additive material is applied a coating weight of from 5 to 40 g/m$^2$.

26. A prepreg according to claim 21 wherein the toughening additive material has a particle size of less than 250 microns.

27. A prepreg according to claim 21 wherein the toughening additive material has a melting point below the cure temperature of the matrix resin material of the prepreg.

28. A prepreg according to claim 1 wherein the resin material of the powder coating has a lower tack than the matrix resin material at least over a temperature range of from 20 to 30° C.

29. A prepreg according to claim 1 formed as a wound roll of the prepreg, optionally wherein the powder coating layers of adjacent prepreg layers of the roll directly contact each other, the adjacent powder coating layers being substantially unadhered to each other.

30. A method of manufacturing a structural member of fibre-reinforced composite material, the method comprising the steps of:
 a. providing a plurality of prepregs according to claim 1;
 b. assembling the plurality of prepregs as a stack thereof so that the powder coating layer of at least one of the prepregs is adjacent to a powder coated layer or matrix resin surface of an adjacent prepreg to form at least one air passage between the prepregs;
 c. subjecting the stack to a vacuum to consolidate the stack and remove air from between the adjacent prepregs of the stack, the at least one air passage venting air between the prepregs; and
 d. curing the matrix resin material to form the structural member.

* * * * *

UNITED STATES PATENT AND TRADEMARK OFFICE
CERTIFICATE OF CORRECTION

| | |
|---|---|
| PATENT NO. | : 10,016,966 B2 |
| APPLICATION NO. | : 14/372770 |
| DATED | : July 10, 2018 |
| INVENTOR(S) | : Benjamin Edward Creaser and Paul John Spencer |

It is certified that error appears in the above-identified patent and that said Letters Patent is hereby corrected as shown below:

On the Title Page

Inventors amend "Benjamin Creaser Creaser" to -- Benjamin Edward Creaser --

In the Claims

Column 29, Line 54 (Claim 1, Line 10) – after "which" insert -- is --

Signed and Sealed this
Twenty-first Day of August, 2018

Andrei Iancu
*Director of the United States Patent and Trademark Office*